(12) United States Patent
Yucebay et al.

(10) Patent No.: US 6,233,237 B1
(45) Date of Patent: May 15, 2001

(54) METHOD AND PROTOCOL FOR CONNECTING DATA CALLS USING R2 SIGNALING

(75) Inventors: Mustafa S. Yucebay, Naperville; Richard H. E. Smith, Prospect heights; Eric V. Erickson, Mt. Prospect, all of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/017,221

(22) Filed: Feb. 2, 1998

(51) Int. Cl.[7] .................................................. H04M 3/22
(52) U.S. Cl. ...................... 370/384; 370/467; 370/522; 379/229
(58) Field of Search .................................. 370/465, 466, 370/467, 470, 472, 493, 231, 235, 236, 384, 522; 375/377; 379/93.15, 93.31, 93.32, 93.34, 127, 229

(56) References Cited

U.S. PATENT DOCUMENTS

| | | | |
|---|---|---|---|
| 4,479,229 | * 10/1984 | Wolters | 375/335 |
| 4,742,534 | * 5/1988 | Verbeek et al. | 375/335 |
| 5,091,904 | * 2/1992 | Back et al. | 370/220 |
| 5,353,326 | * 10/1994 | Jung | 379/6 |
| 5,377,186 | * 12/1994 | Wegner et al. | 370/220 |
| 5,528,595 | 6/1996 | Walsh et al. . | |
| 5,572,524 | * 11/1996 | Harada et al. | 370/468 |
| 5,577,105 | 11/1996 | Baum et al. . | |
| 5,655,001 | * 8/1997 | Cline et al. | 370/328 |
| 5,787,164 | * 7/1998 | Haines et al. | 379/372 |
| 5,983,282 | * 11/1999 | Yucebay | 709/249 |
| 6,023,474 | * 2/2000 | Gardner et al. | 370/467 |

* cited by examiner

Primary Examiner—Hassan Kizou
Assistant Examiner—Saba Tsegaye
(74) Attorney, Agent, or Firm—McDonnell Boehnen Hulbert & Berghoff; Stephen Lesavich

(57) ABSTRACT

A method and protocol for creating R2 data connections over a telecommunications connection is presented. The protocol includes a small set of signals used to create a data connection over a telecommunications using R2-MFC signaling for voice connections. The method includes a first set of methods for R2-MFC short cycling and a second set of methods for R2-MFC spoofing. R2-MFC short cycling uses the R2 data connection protocol and a tone detection apparatus to create a data connection. R2-MFC spoofing uses the R2 data connection protocol to create a data connection without a tone detection apparatus to detect a forward register signal. The method and protocol allow a data connection to be quickly and economically completed using R2-MFC signaling. The method and protocol are suitable for data services such as Internet or intranet access and teleconferencing.

29 Claims, 17 Drawing Sheets

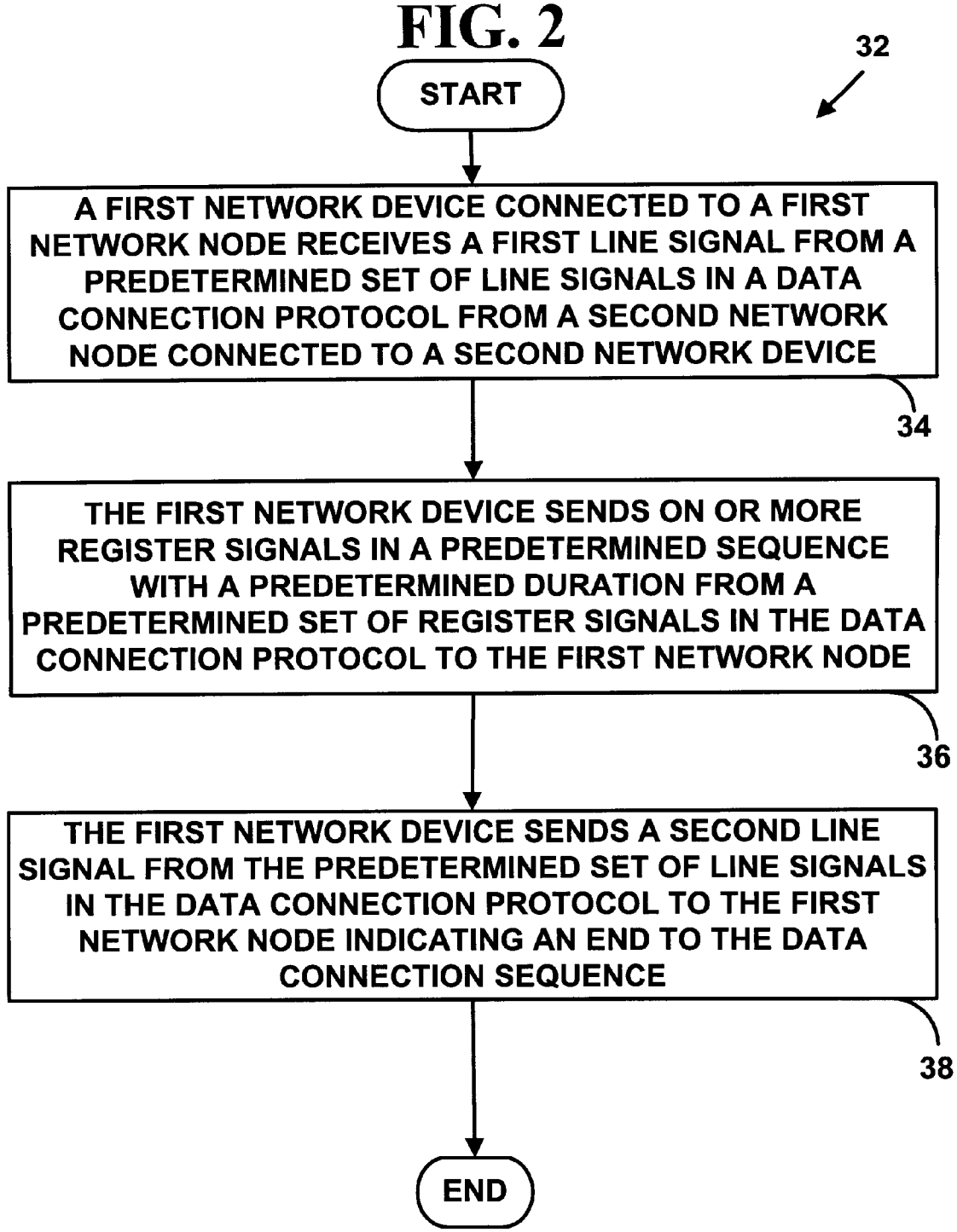

FIG. 3

R2 DATA CONNECTION PROTOCOL — 40

| | |
|---|---|
| 42 | SEIZURE -- SIGNALING TIME SLOT, A FIRST-BIT=0, AND A SECOND-BIT=0 |
| 44 | SEIZURE ACK-- SIGNALING TIME SLOT, A FIRST-BIT=1, AND A SECOND-BIT=1 |
| 46 | ANSWER -- SIGNALING TIME SLOT A FIRST-BIT=0, AND A SECOND-BIT=1 |
| 48 | CLEAR FORWARD -- SIGNALING TIME SLOT A FIRST-BIT=1, AND A SECOND-BIT=0 |
| 50 | A3 -- (1020 Hz + 900 Hz) AS DATA BITS IN THE SAME TIME SLOT |
| 52 | A4 -- (1140 Hz + 780 Hz) AS DATA BITS IN THE SAME TIME SLOT |
| 54 | B4 -- (1140 Hz + 780 Hz) AS DATA BITS IN THE SAME TIME SLOT |
| 56 | A6 -- (900 Hz + 780 Hz) AS DATA BITS IN THE SAME TIME SLOT |
| 58 | B6 -- (900 Hz + 780 Hz) AS DATA BITS IN THE SAME TIME SLOT |
| 60 | FORWARD SIGNALS -- ANY COMBINATION OF 1380 Hz, 1500 Hz, 1620 Hz, 1740 Hz, 1860 Hz OR 1980 Hz IN A TWO SIGNAL COMBINATION AS DATA BITS IN THE SAME TIME SLOT |

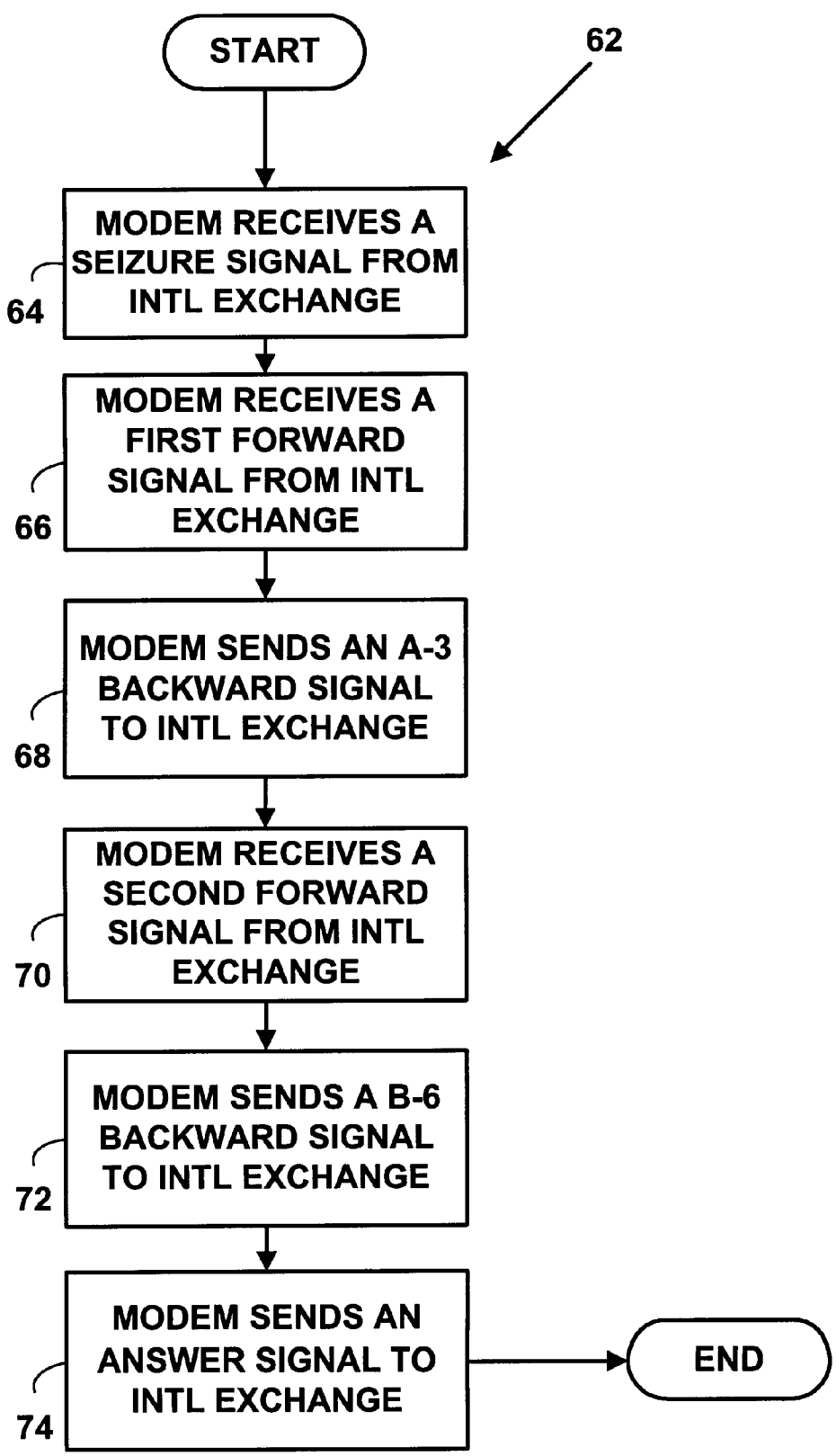

METHOD AND PROTOCOL FOR CONNECTING DATA CALLS USING R2 SIGNALING

BACKGROUND OF THE INVENTION

A. Field Of Invention

The present invention relates to signaling in a telecommunication network and the processes by which telephone calls are established in a telecommunication network. More specifically, it relates to a method and protocol using R2 signaling for connecting data calls originating from computers or other data terminals, and which are destined for receipt by a host computer system.

The methods disclosed herein are performed by an element of communications equipment called a Network Access Server ("NAS"), which is connected to a host computer system, typically through a network. The network access server provides numerous individual dial-up modem connections to a network such as a LAN or WAN. The NAS interfaces with a by way of multiplexed trunk lines, and then routes the data to a host computer over the network. Network access servers are well-known devices, and are widely available from companies such as 3Com Corporation, Livingston Enterprises, and Ascend, to name a few.

B. Description of Related Art

The R2 protocol is a signaling protocol in an inter-register family of signaling systems standardized by the International Telecommunications Union-Telecommunication Standardization Sector ("ITU-T", formerly known as the CCITT). R2 is used mostly in Europe and other regions in the world, but is not used in North America. The "R" stands for Regional standard recommendation and includes ITU-T Q-series standards, Q.400 to Q.490 and the "2" stands for the second regional standard. R2 is used over trunks in an international telecommunications system. As is known in the telecommunication arts, a trunk is a circuit connecting two switching elements such as telecommunication exchanges. Trunks are combined into trunk groups, creating a high capacity circuit capable of transmitting multiple channels of information between two telecommunication exchanges.

The R2 protocol is broken down into two parts: line signaling; and register signaling. Line signaling coveys call status information about a state of a call such as off-hook, on-hook, busy, etc. with call setup and call tear down states (e.g., idle, seize, seize acknowledgment, answered, clearback, clear-forward and blocked). Register signaling, also known as Multi-Frequency Compelled ("MFC") signaling, is used for addressing. It conveys an ANI ("Automatic Number Identification", i.e., a calling number) and a DNIS ("Dialed Number Identification Service", i.e., a called number), a calling party's category and other network connections with handshaking or an acknowledgment process that includes "forward" (i.e., send) and "backward" (i.e., receive) signals. A forward signal is the signal transmitted by an R2 outgoing register to a remote R2 incoming register. When the signal is confirmed by an R2 incoming register, a backward signal is then transmitted back to the R2 outgoing register.

In a digital transmission system, four bits of a Time Division Multiplexing ("TDM") time slot on a multi-channel trunk are used for R2 signaling, two signaling bits per voice channel. As is known in the telecommunication arts, an ITU-T E1 has a bit rate of 2.048 Mega-bit-per-second ("Mbps") with 32 time slots of 8-bits each sampled every 125 microseconds (i.e., $32 \times 8\text{-bits}/125 \times 10^{-6}$ seconds= 2.048 Mbps). Time-slot-zero is used for frame alignment and synchronization and time-slot-16 is used for signaling information. The remaining time-slots are used for voice information. The four R2 signaling bits include "Af" and "Bf" bits for forward signals, and "Ab" and "Bb" bits for backward signals and are used in time-slot-16 on an E1.

For register signaling in the MFC mode, compelled signaling is achieved by sending pairs of two out of six designated frequencies simultaneously. A maximum of six frequencies are used for signaling between international telecommunication exchanges. Different sets of frequencies are used for the forward and backward signals. This provides a total of 15 multi-frequency combinations in each direction (i.e., forward and backward) for a maximum of 30. Each combination number has a defined meaning of a signal that varies with different forward and backward groups. For example MFC-1 uses a frequency of 1,380 Hertz ("Hz") in the forward direction and a frequency of 1,020 Hz in the backward direction.

Forward signals consists of 15 combination numbers and include Group I signals for outgoing switch equipment control of a calling party and Group II signals for a calling party's category. Backward signals consists of 15 combination numbers and include Group A control signals to request forward signals that indicate the called party's line condition Group B and signals that indicate the state of a called party.

Group II and forward signals use the same frequencies as Group I signals. Group B backward signals use the same frequencies as Group A, but the meanings of the signals differ between the groups that use identical frequency pairs. For complete information on the combinations see the ITU-T R2 standard, Q.400–Q.490. R2 is typically used to create connections for voice calls sent over the multiple time slots in an E1.

There are several problems associated with using R2 signaling to create data connections. The R2 voice connection signals are numerous and many of the signals are not necessary if a party desires to make a data connection instead of a voice connection. Using R2 voice connection signals to make a data connection unnecessarily increases the complexity of a R2 signaling system.

Another problem with R2 voice signals is that individual countries may require special R2 signals to interface with their own unique telecommunication equipment for voice connections. Additional special R2 signals may also be required to complete data connections to interface with a country's telecommunications equipment. This increases the number of R2 signals that need to be interpreted.

Yet, another problem with using existing R2 voice signaling to make a data call is that the R2 forward register signals require a tone decoder to decode the available R2 forward register signals. This increases the cost of making a data connection if voice connections will not be made.

SUMMARY OF THE INVENTION

In accordance with an illustrative embodiment of the present invention, the problems associated with using R2 signals to create a data connection are overcome. A method and protocol for making an R2 data connection are presented. The method includes receiving a first line signal on a first network device connected to a first network node. The first line signal is a line signal from a predetermined set of line signals comprising a data connection protocol selected from a larger set of voice connection protocol signals. In an illustrative embodiment of the present invention, the voice connection protocol is a R2 voice connection protocol and the data connection protocol is a new R2 data connection protocol described below.

After receiving the first line signal, the first network device sends one or more register signals in a predetermined sequence with a predetermined duration from a predetermined set of register signals. The register signals are register signals from a predetermined set of register signals from the voice connection protocol. The predetermined set of register signals sent in a predetermined sequence with a predetermined duration allow a data connection to be established. After sending the one or more register signals, the first network device sends a second line signal from the predetermined set of line signals in the data connection protocol indicating an end of data connection signaling. A data connection is established between the first network device and a second network device.

In an illustrative embodiment of the present invention, a R2 data connection signaling protocol is created from the R2 voice connection signaling protocol. As was discussed above, the multiple R2 voice connection signaling groupings include: R2 line signals, MFC Group I and Group II forward signals and MFC Group A and Group B backward signals. A set of line signals is selected from the multiple R2 line signals (e.g., seizure, seizure acknowledgment, answer, and clear forward). A set of register signals is selected from the multiple R2 register signal groupings (e.g., A-3, A-4, B-4, A-6 and B-6 from the Group A and Group B backward signals, and the forward signals from the Group I and Group II forward signals). The selected set of line signals and the selected set of register signals from the R2 voice connection protocol provide a new R2 data connection protocol.

In one embodiment of the present invention, the data connection protocol is used with a tone detection apparatus to detect forward register signals from the selected set of register signals. In another embodiment of the present invention, the data connection protocol is used without a tone detection apparatus.

In an illustrative embodiment of the present invention, the R2 data connection protocol includes: a seizure signal used in a signaling time slot (e.g., a TDM time-slot-16 on an E1) where an first-bit=0 and a second-bit=0; a seizure acknowledgment signal used in a signaling time slot, where an first=bit 1 and a second-bit=1; an answer signal used in a signaling time slot, where an first-bit=0 and a second-bit=1; a clear forward signal used in a signaling time slot, where an first-bit=1 and a second-bit=0; a backward signal A-3 that comprises signals of (1020 Hz+900 Hz) as data bits in the same time slot (i.e., a TDM data time slot on an E1); backward signals A-4 and B-4 that comprise signals of (1140 Hz+780 Hz) as data bits in the same time slot; backward signals A-6 and B-6 that comprise signals of (900 Hz+780 Hz) as data bits in the same time slot; and forward signals that are any two signals of 1380 Hz, 1500 Hz, 1620 Hz, 1740 Hz, 1860 Hz and 1980 Hz in a two signal combination as data bits in the same time slot. However, more or fewer signals could also be used in the R2 data connection protocol.

Since the R2 data connection protocol only includes a small number of the R2 voice connection signals from each of the signal groupings, it increases the connection speed and lowers the cost of a R2 data connection. It is also easily adaptable and configurable for R2 signaling variations between countries.

The R2 data connection protocol is used with two types of R2-MFC data connection protocol processes each comprising multiple methods. The first data connection method includes a "R2-MFC short cycling" process that uses a tone decoder apparatus to make a data connection. The second signaling process includes a "R2-MFC spoofing" process which does not use a tone decoder apparatus to make a data connection. R2-MFC short cycling provides rapid and reliable data connections even with telecommunications equipment that has connection timing variations. R2-MFC spoofing provides rapid and least cost data connections without using a tone detection apparatus, thereby reducing the cost of data connection equipment. Both R2-MFC short cycling and R2-MFC spoofing include multiple processes that are explained in detail below. R2-MFC short cycling and R2-MFC spoofing are suitable for data services such as Internet or intranet access and teleconferencing. Data connection origination may be from many types of data terminals including personal computers, card swipes, teleconferencing equipment and others.

The foregoing and other features and advantages of an illustrative embodiment of the present invention will be more readily apparent from the following detailed description, which proceeds with references to the accompanying drawings.

BRIEF DESCRIPTION OF THE DRAWINGS

FIG. 2 is a flow diagram illustrating a method for establish a data connection using R2 signaling;

FIG. 3 is a block diagram illustrating a R2 data connection protocol;

FIG. 4 is a flow diagram illustrating a method for R2-MFC short cycling without seizure acknowledgment;

DETAILED DESCRIPTION OF AN
ILLUSTRATIVE EMBODIMENT

Figure 1:
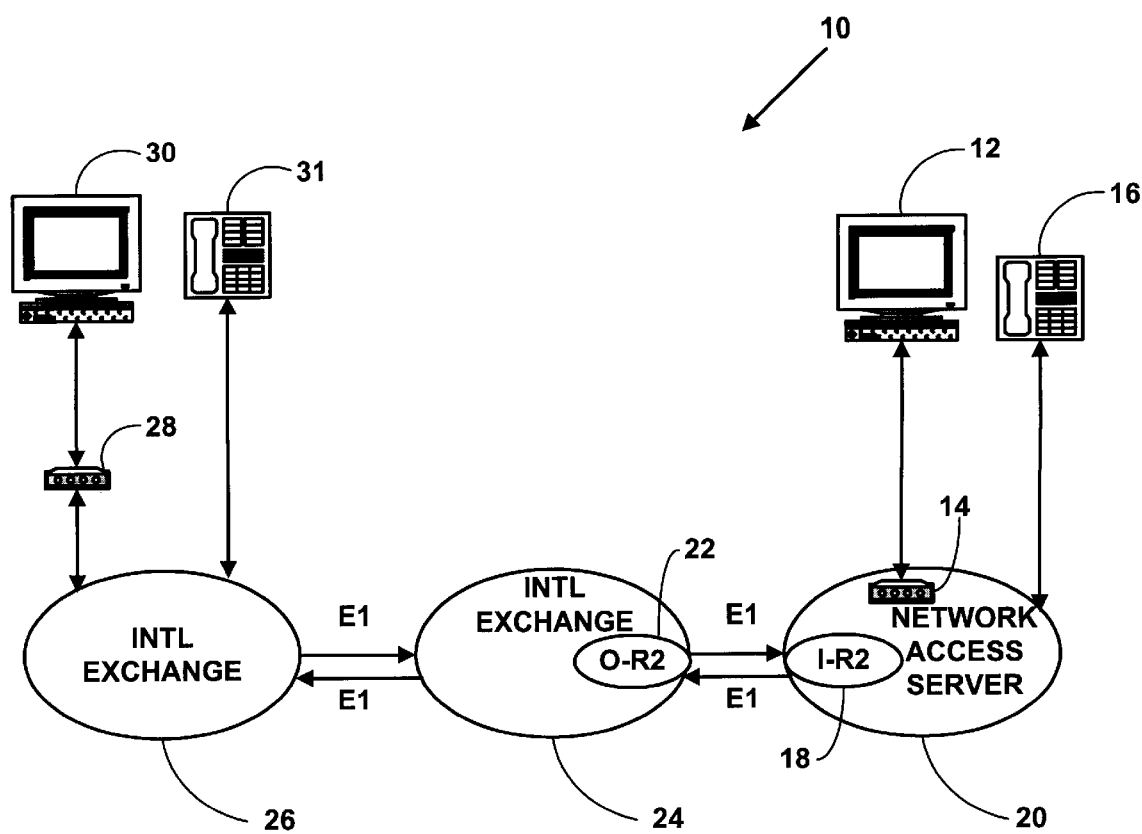
FIG. 1 is a block diagram of a telecommunications system used to implement an illustrative embodiment of the present invention.

FIG. 1 is a block diagram of a telecommunications system 10 used to implement an illustrative embodiment of the present invention. A first computer 12 with a first modem 14 or first telephone 16 sends signals and data as bits of information to an incoming R2 register 18 in a Network Access Server ("NAS") 20. FIG. 1 illustrates first modem 14 included within NAS 20 (e.g., as a modem card connected to a common bus within NAS 20). However, first modem 14 can also be external to NAS 20 and the present invention is not limited to a NAS with internal modems. The information in Incoming R2 register 18 ("I-R2") is sent to an Outgoing R2 register 22 ("O-R2") in a first international exchange 24 over an E1 using R2 signaling. In an illustrative embodiment of the present invention, the international exchange is an international switching exchange or an international gateway exchange that translates signaling protocols between countries.

The information in outgoing R2 register 20 in first international exchange 24 is forwarded through one or more other international exchanges over one or more E1 connections to a second international exchange 26 using R2 signaling. Second international exchange 26 sends the information via another set or incoming and outgoing R2 registers (not illustrated in FIG. 1) to a second modem 28 connected to a second computer 30 or a second telephone 31. However, other telecommunications connections which uses R2 signaling can be used, and the invention is not limited to an E1 connection or telecommunications system 10 shown in FIG. 1.

In an illustrative embodiment of the present invention, first computer and first modem 14 desire to establish a data connection with second modem 28 and second computer 30. A data connection is established between first modem 14 and second modem 28 using a new R2 data connection protocol based on the ITU-T R2 voice connection protocol. The new R2 data connection protocol uses only a small number of signals from the set of R2 voice connection protocol signals used to establish voice connections using ITU-T R2 signaling on an E1. Thus, the new R2 data connection protocol allows a data connection to be established quickly and efficiently compared to the establishment of a voice connection using R2 signaling.

As is known in the art, the ITU-T R2 signaling protocol is an inter-register family of signaling systems used mostly in Europe on ITU-T E1s. For more information, see ITU-T Q.400–Q.490 standards. As is known in the telecommunication arts, an E1 has 32 Time Division Multiplexing ("TDM") time slots of 8 bits for sending information sampled every 125 microseconds for a data rate of 2.048 Mbps. Depending on the transmission system in use, a specific line signaling process is defined for R2.

On two-wire loops, the R2 loop uses an advanced Direct Current ("DC") signaling method ("R2D"), which uses loop closure and disconnect as forward signals and polarity reversal signals on the loop as backward signals. If metering signals have to be transferred, they are encoded by polarity reversal pulses. A disconnect for the loop is accomplished by switching off the loop feeding a backward signal to clear a call from the terminating end.

On analog four-wire Frequency Division Multiplexing ("FDM") systems, R2 Analog ("R2A") is used. This is a signal frequency for out-of-band signaling with tone-on-idle. A tone of a defined frequency is applied during idle state in each direction. Off-hook is signaled by tone-off, and on-hook by tone-on. The two signals in each direction are sufficient because with R2-MFC comprehensive inter-register signaling is used.

R2-MFC inter-register signaling includes Group I and Group II forward signals and Group A and Group B backward register signals. Table 1 illustrates R2 Group I forward signals. Group I signals are the outgoing signals for outgoing switching equipment to control the calling party and send calling parting address information.

TABLE 1

| Forward Register Signal | Meaning of the Signal |
|---|---|
| I-1 | Digit 1 |
| I-2 | Digit 2 |
| I-3 | Digit 3 |
| I-4 | Digit 4 |
| I-5 | Digit 5 |
| I-6 | Digit 6 |
| I-7 | Digit 7 |
| I-8 | Digit 8 |
| I-9 | Digit 9 |
| I-10 | Digit 0 |
| I-11 | Access to Special Service (digit 11) |
| I-12 | Request not accepted |
| I-13 | Access to Test Equipment (digit 13) |
| I-14 | Spare |
| I-15 | a) End of dialing (B-digits) b) End of identification (A-digits) |

Table 2 illustrates R2 Group II forward signals. The Group II forward signals are a calling party's category signals sent by outgoing registers in reply to the backward signals shown in Tables 3 and 4 below.

TABLE 2

| Forward Register Signal | Meaning of the Signal |
|---|---|
| II-1 | Subscriber without priority |
| II-2 | Subscriber with priority |
| II-3 | Maintenance equipment |
| II-4 | Coin-box |
| II-5 | Operator national |
| II-6 | Data Transmission |
| II-7 | Subscriber with International Priority |
| II-8 | Operator with forward transfer facility |
| II-9 | Spare |
| II-10 | Spare |
| II-11 | Spare |
| II-12 | Spare |
| II-13 | Spare |
| II-14 | Spare |
| II-15 | Spare |

Table 3 illustrates R2 Group A backward signals. Group A backward signals are used to acknowledge Group I forward signals (Table 1) and under certain conditions Group II forward signals (e.g., A-5, Table 2). Generally, the Group A backward signals require information from the preceding international exchange. The signals A-4 and A-6 form the end of a signaling cycle.

TABLE 3

| Backward Register Signal | Meaning of the Signal |
|---|---|
| A-1 | Send next digit (n+1) |
| A-2 | Send last but one digit (n+1) |
| A-3 | Address-complete, changeover to reception of Group B signals |
| A-4 | Congestion in the national network |
| A-5 | Sending calling party's category, A number request |
| A-6 | Address complete, charge, set up speed conditions |
| A-7 | Send last two digits (n-2) |
| A-8 | Send last three digits (n-3) |
| A-9 | Send first digit |
| A-10 | Spare |
| A-11 | Signal for International Networking |
| A-12 | Signal for International Networking |

TABLE 3-continued

| Backward Register Signal | Meaning of the Signal |
|---|---|
| A-13 | Signal for International Networking |
| A-14 | Signal for International Networking |
| A-15 | Signal for International Networking |

Table 4 illustrates the R2 Group B backward signals. Group B backward signals acknowledge a Group II forward signal and are preceded by the address-complete signal A-3 (Table 3). The Group B backward signals convey information about the condition of switching equipment in the incoming telecommunication exchange, or about the condition of a subscriber's line to outgoing R2-MFC registers.

TABLE 4

| Backward Register Signal | Meaning of the Signal |
|---|---|
| B-1 | Subscriber's line free, charge, B-party call control |
| B-2 | Charged number |
| B-3 | Subscriber's line busy |
| B-4 | Congestion |
| B-5 | Unallocated number |
| B-6 | Subscriber's line free, charge |
| B-7 | Subscriber's line free, no charge |
| B-8 | Subscriber's line out of order |
| B-9 | Spare |
| B-10 | Spare |
| B-11 | Spare |
| B-12 | Spare |
| B-13 | Spare |
| B-14 | Spare |
| B-15 | Spare |

The compelled signaling cycle for R2-MFC is achieved by sending pairs of two out of six frequencies simultaneously. R2-MFC uses a maximum of six frequencies for signaling between international telecommunication exchanges. Different sets of frequencies are used for forward and backward signals. Table 5 illustrates frequencies and signals used in each direction for R2-MFC.

TABLE 5

| Frequency Id | Forward Direction (Hz) | Backward Direction (Hz) |
|---|---|---|
| F0 | 1380 | 1140 |
| F1 | 1500 | 1020 |
| F2 | 1620 | 900 |
| F3 | 1740 | 780 |
| F4 | 1860 | 660 |
| F5 | 1980 | 540 |

Table 6 illustrates MFC combinations used for R2-MFC. For example, MFC-1 uses F0 (Table 5) and F1 (Table 5). The frequencies for F0 and F1 will vary depending on the direction (e.g., forward F0=1380 Hz and backward F0=1140 Hz). The stars "*" in Table 6 indicate an invalid signal combination.

TABLE 6

| MFC | F0 | F1 | F2 | F3 | F4 | F5 |
|---|---|---|---|---|---|---|
| F0 | * | 1 | 2 | 4 | 7 | 11 |
| F1 | * | * | 3 | 5 | 8 | 12 |
| F2 | * | * | * | 6 | 9 | 13 |
| F3 | * | * | * | * | 10 | 14 |

TABLE 6-continued

| MFC | F0 | F1 | F2 | F3 | F4 | F5 |
|---|---|---|---|---|---|---|
| F4 | * | * | * | * | * | 15 |
| F5 | * | * | * | * | * | * |

When R2D is used, 2 signaling bits in each direction (i.e., 4 bits total) per voice circuit are used in time-slot-16 on an E1. Table 7 illustrates R2D line signals for the four signaling bits, Af and Bf for the forward direction and Ab and Bb for the backward direction. The arrows ("←, →") indicate the direction the signals are sent. The line signals in Table 7 and the register signals in tables 1–4 are applied with a continuous duration until another line or register signal is applied.

TABLE 7

| Line Signal | Af | Bf | Ab | Bb | Signal Duration (ms) |
|---|---|---|---|---|---|
| Idle ←,→ | 1 | 0 | 1 | 0 | Continuous |
| Seizure → | 0 | 0 | 1 | 0 | Continuous |
| Seizure acknowledgment ← | 0 | 0 | 1 | 1 | Continuous |
| Answered ← | 0 | 0 | 0 | 1 | Continuous |
| Clear back ← | 0 | 0 | 1 | 1 | Continuous |
| Clear forward after answered → | 1 | 0 | 0 | 1 | Continuous |
| Clear forward after seizure ack or clear back → | 1 | 0 | 1 | 1 | Continuous |
| Blocked ← | 1 | 0 | 1 | 1 | Continuous |

When R2 is used to signal a voice call, the information in Tables 1–7 are used. Table 8 illustrates exemplary R2 signaling used to make a voice call for telecommunication system 10 shown in FIG. 1. The arrows ("←, →") indicate the direction the signals are sent.

TABLE 8

| Telephone 1 | Incoming R2 Register | More International exchange One | Outgoing R2 Register | Telephone 2 |
|---|---|---|---|---|
| Off hook, loop current → | Line seize signal → | | | |
| Dial digits (044-4-73215678) → | I-12, country-code inspector, no echo suppresser required → | | | |
| | | | ← A-1, send next digit | |
| | (044) I-4, country code digit → | | | |
| | | | ← A-1, send next digit | |
| | I-4, country code digit → | | | |
| | | | ← A-1, send next digit | |
| | I-4, country code digit → | | | |
| | | | ← A-12, send language or discriminating digit | |
| | (4) I-10, language digit → | → | Line Signal Seize → | |
| | | ← | ← A-1, send next digit | |

TABLE 8-continued

| Telephone 1 | Incoming R2 Register | More International exchange One | Outgoing R2 Register | Telephone 2 |
|---|---|---|---|---|
| | (73215678) I-7, first national number digit → | → | → | |
| | | ← | ← A-1, send next digit | |
| | I-1 to I-10, national number digits → | → | | |
| | | ← | ← A-1, send next digits | |
| | I-8, last national number digit → | → | | |
| | | | Line seize → | → |
| | | | ← Proceed to send | |
| | | | Phone number (732145678) → | |
| | | | ST (STop) signal → | |
| | | | ← A-3, address change complete, change over to Group B signals | |
| ← | ← | Ringing Tone | → | → |
| | | | | ← off hook, loop current |
| | Establish speed path, II-7, subscriber call → | → | → | |
| | ← | ← | ← B-6 subscriber line fee, charge call | |
| ← | ← | Answer Tone | → | → |
| Talk → | ← | Talking | → | ← Talk |

As is illustrated in Table 8, making a voice connection using R2 signaling includes a large number of steps and the sending and receiving of a large number of signals. Many of the signals sent and received to complete a voice connection are not necessary to complete a data connection.

In an illustrative embodiment of the present invention, a new R2 data connection protocol is used. The R2 data connection protocol uses selected signaling elements from the R2 voice connection protocol groupings to provide an efficient and cost effective data call connection mechanism (e.g., between first computer 12 with modem 14 and second computer 24 with modem). The R2 data connection protocol does not require the large number of signals used to create a R2 voice connection.

FIG. 2 is flow diagram illustrating a method 32 for establishing a data connection using R2 signaling. At step 34, a first network device connected to a first network node receives a first line signal from a predetermined set of line signals from a data connection protocol from a second network device connected to a second network node. The data connection protocol is a sub-set of register and lines signals from a voice connection protocol.

At step 36, the first network device sends one or more register signals in a predetermined sequence with a predetermined duration from a predetermined set of register signals from the data connection protocol. The one or more register signals allow a data connection to be established between a first and a second network device. The second network node forwards the register signals to the second network device.

At step 38, the first network device sends a second line signal from the data connection protocol indicating end of the data connection sequence. A data connection is established between the first network device on the first network node and the second network device on the second network node.

In an illustrative embodiment of the present invention, the data connection protocol is a R2 data connection protocol 40 that is illustrated in FIG. 3 comprising multiple line signals and multiple register signals from a R2 voice connection protocol. In one embodiment of the present invention, register signals (e.g., forward signals) from data connection protocol 40 are detected by a tone detection apparatus. In another embodiment of the present invention, data connection protocol 40 is used without a tone detection apparatus. When a tone detection apparatus is not used, a network device such as a modem does not detect forward signals that still may be sent by a network node (e.g., international exchange). However, the network device still detects line signals (e.g., seizure signals) sent by the international exchange to initiate and terminate a data connection sequence.

In another embodiment of the present invention, the register signals from data connection protocol 40 are applied with a tone duration that is less than a duration used to apply for register signals used in a voice connection protocol (e.g., R2 voice signaling). The shorter duration allows signals in data connection protocol 40 to be distinguished from those in a voice connection protocol. For example, selected register signals in the R2 data connection protocol are applied with a duration of 150 to 300 milliseconds while register signals in the R2 voice signaling protocol are applied with a continuous duration until a next R2 register or line signal is applied.

FIG. 3 is a block diagram illustrating an exemplary R2 data connection protocol 40 for an illustrative embodiment of the present invention comprising multiple line signals and multiple register signals. R2 data connection protocol 40 is stored in a computer readable medium as a set of software instructions as multiple data bits. The multiple data bits are maintained on magnetic disks, optical disks, and any other volatile or non-volatile mass storage system readable by a Central Processing Unit ("CPU"). The computer readable medium includes cooperating or interconnected computer readable media, which exist exclusively on the telecommunications system 10, or be distributed among multiple interconnected telecommunication systems that may be local or remote to telecommunication system 10.

It will be appreciated that acts and symbolically represented operations for the data bits include the manipulation of electrical signals by the CPU. The electrical system represents data bits which cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

R2 data connection protocol 40 includes a seizure signal 42 used in a signaling time slot where an first-bit=0 and a second-bit=0. The signaling bits are used in a signaling time slot such as time-slot-16 on an E1. Seizure acknowledgment signal 44 is used in a signaling time slot where an first-bit=1 and a second-bit=1. Answer signal 46 is used in a signaling time slot, where an first-bit=0 and a second-bit=1. Clear forward signal 48 is used in a signaling time slot, where an first-bit=1 and a second-bit=0.

Backward signal A-3 50 comprises signals of (1020 Hz+900 Hz) as data bits in the same data time slot (i.e., TDM data time slot on an E1). In an illustrative embodiment of the present invention, data time slots hold both voice and data information. Backward signals A-4 52 and B-4 54 comprise signals of (1140 Hz+780 Hz) as data bits in the same data time slot.

Backward signals A-6 56 and B-6 68 comprise signals of (900 Hz+780) as data bits in the same data time slot. Forward signals 60 are any two signals of 1380 Hz, 1500 Hz, 1620 Hz, 1740 Hz, 1860 Hz and 1980 Hz in a two signal combination as data bits in the same data time slot.

R2 data connection protocol 40 comprises multiple line signals including seizure signal 42, seizure acknowledgment signal 42, answer signal 46 and clear forward signal 48. However, more or fewer line signals could also be used. R2-MFC data connection protocol 40 also comprises backward register signals A3 50, A4 52, B4 54, A6 56, B6 58 and forward register signals 60. However, more or fewer register signals could also be used.

Table 9 illustrates C/C++ pseudo-code for an exemplary data structure for using R2 data connection protocol 40 signals in telecommunications system 10. However, other data structures and other programming languages may also be used to represent R2 data connection protocol 40.

TABLE 9

```
R2_MFC_data_protocol_struct
{
    //signals 42,44,46,48
    time_slot_signal: xf; // first X bit
    time_slot_signal: yf; // first Y bit
    time_slot_signal: xb; // second X bit
    time_slot_signal: yb; // second Y bit
    //backward signals 50, 52, 54, 56, 58
    time_slot_x: first_backward_signal_component;
    time_slot_x: second_backward_signal_component;
    //forward signals 60
    time_slot_y: first_forward_signal_component;
    time_slot_y: second_forward_signal_component;
}
```

Since R2 data connection protocol 40 includes a small number of signals, it increases the connection speed of R2 data connection and is easily adaptable and configurable for MFC variations between countries. R2 data connection protocol 40 can be used with a tone detection apparatus to detect forward register signals with a method called "R2-MFC short cycling" or without a tone detection apparatus to detect forward register signals with a method "R2-MFC spoofing." R2-MFC-spoofing further decreases the cost of a R2-MFC data connection by allowing the data connection to be established without any tone detection apparatus for recognizing forward register signals. As is known in the telecommunication arts a tone detection apparatus detects tones of certain frequencies (e.g., the forward register signals in FIG. 3). R2-MFC short cycling and R2-MFC spoofing include several variations. The present invention is described with respect to R2 signaling between an International Exchange, a NAS and a modem. However, the present invention is not limited to the International Exchange, the NAS or the modem and other network nodes and devices (e.g., a gateway) could also be used.

FIG. 4 is a flow diagram illustrating a method 62 for R2-MFC short cycling to complete a data connection without seizure acknowledgment using R2 data connection protocol 40.

Method 62 is illustrated with FIG. 1 and is used between modem 14, NAS 20 and international exchange 22 to complete a data connection with modem 28.

Returning to FIG. 4, international exchange 22 sends a seizure signal 42 from outgoing R2 register 22 on a first end of an outgoing E1 using R2-MFC signaling in response to a data connection request from modem 28. At a second end of the E1 trunk, incoming R2 register 18 on NAS 20 receives seizure signal 42 and passes it along to modem 14. At step 64, modem 14 receives seizure signal 32.

International exchange 24 sends a first forward signal 60 from outgoing R2 register 22 on the first end of the outgoing E1. At a second end of the E1 incoming R2 register 28 on NAS 20 receives first forward signal and passes it along to modem 14. At step 66, modem 14 receives first forward signal 60. At step 68, modem 14 sends a first backward signal, an A-3 signal 50 (e.g., address complete) to NAS 20. NAS 20 forwards the first backward signal to international exchange 24. International exchange 24 sends a second forward signal 60' to modem 14 via the R2 outgoing register 22, incoming R2 register 18 and NAS 20. At step 70, modem 14 receives second forward signal 60'. At step 72, modem 14 sends a second backward signal, a B-6 signal 58 (e.g., subscriber line free, charge) to international exchange 24.

At step 74, modem 14 sends an answer signal 46 to international exchange 24. There is now a data connection between modem 28 and computer 30, or telephone 31, modem 14 and computer 12 or telephone 16 over an E1 trunk. Hereinafter, when signals are "sent" between modem 28 and modem 14, outgoing R2 register 22, incoming R2 register 18, NAS 20 and international exchanges (24,26) are used as described for method 62 not repeated for the sake of simplicity for the remaining methods.

Figure 5:
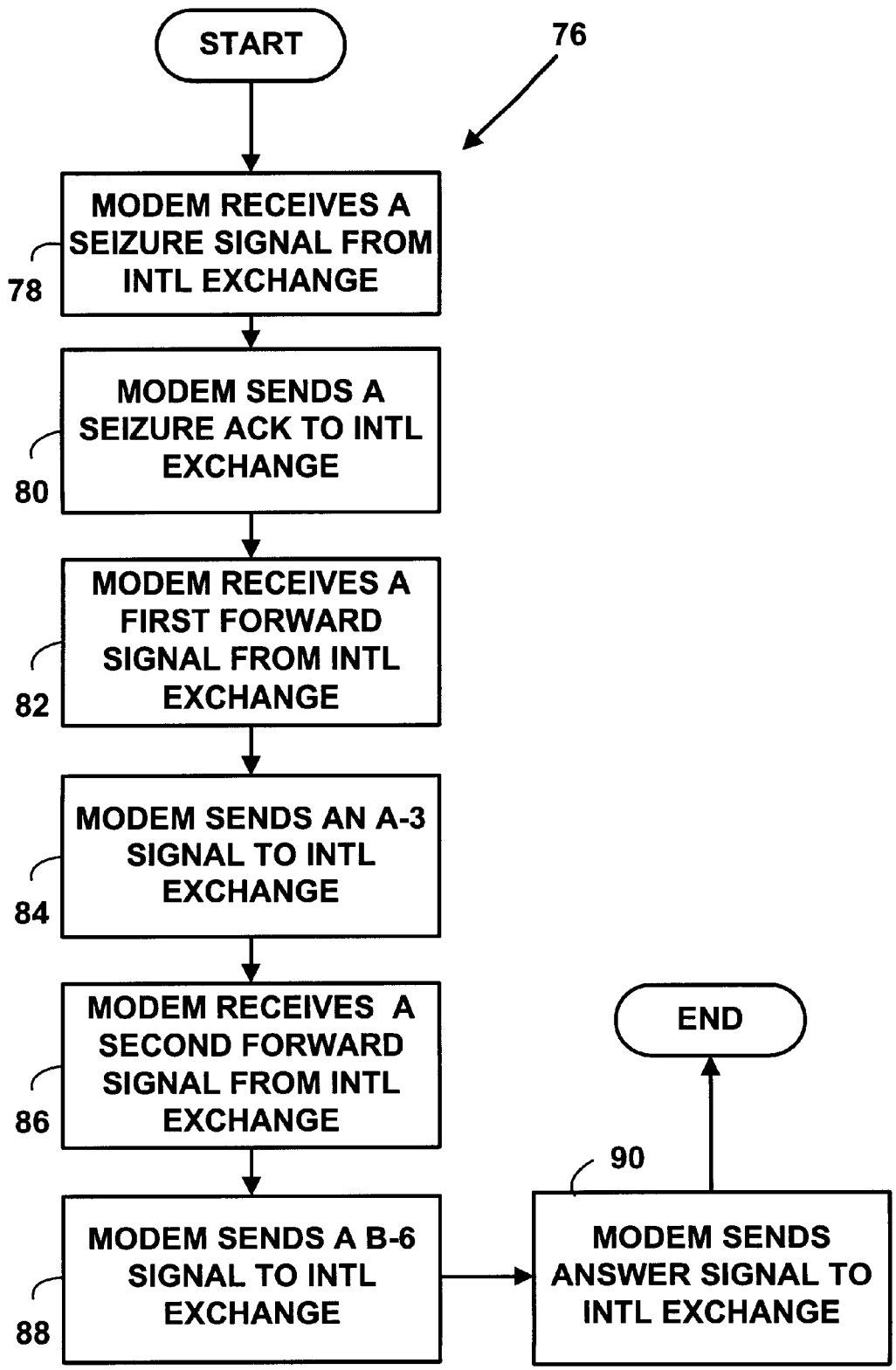
FIG. 5 is a flow diagram illustrating a method for R2-MFC short cycling with seizure acknowledgment.

FIG. 5 is a flow diagram illustrating a method 76 for short R2-MFC cycling with seizure acknowledgment. Method 76 is used to complete a data connection between with seizure acknowledgment using R2 data connection protocol 40. Method steps 78, 82, 84, 86, 88 and 90 are identical to steps 64, 66, 68, 70, 72, and 74 of method 62. In addition, at step 80, modem 14 sends a seizure acknowledgment 44 to international exchange 24 in response to the seizure signal 42 at step 78. Method 76 completes a data connection between modem 28 and modem 14 over an E1 trunk with seizure acknowledgment.

Figure 6:
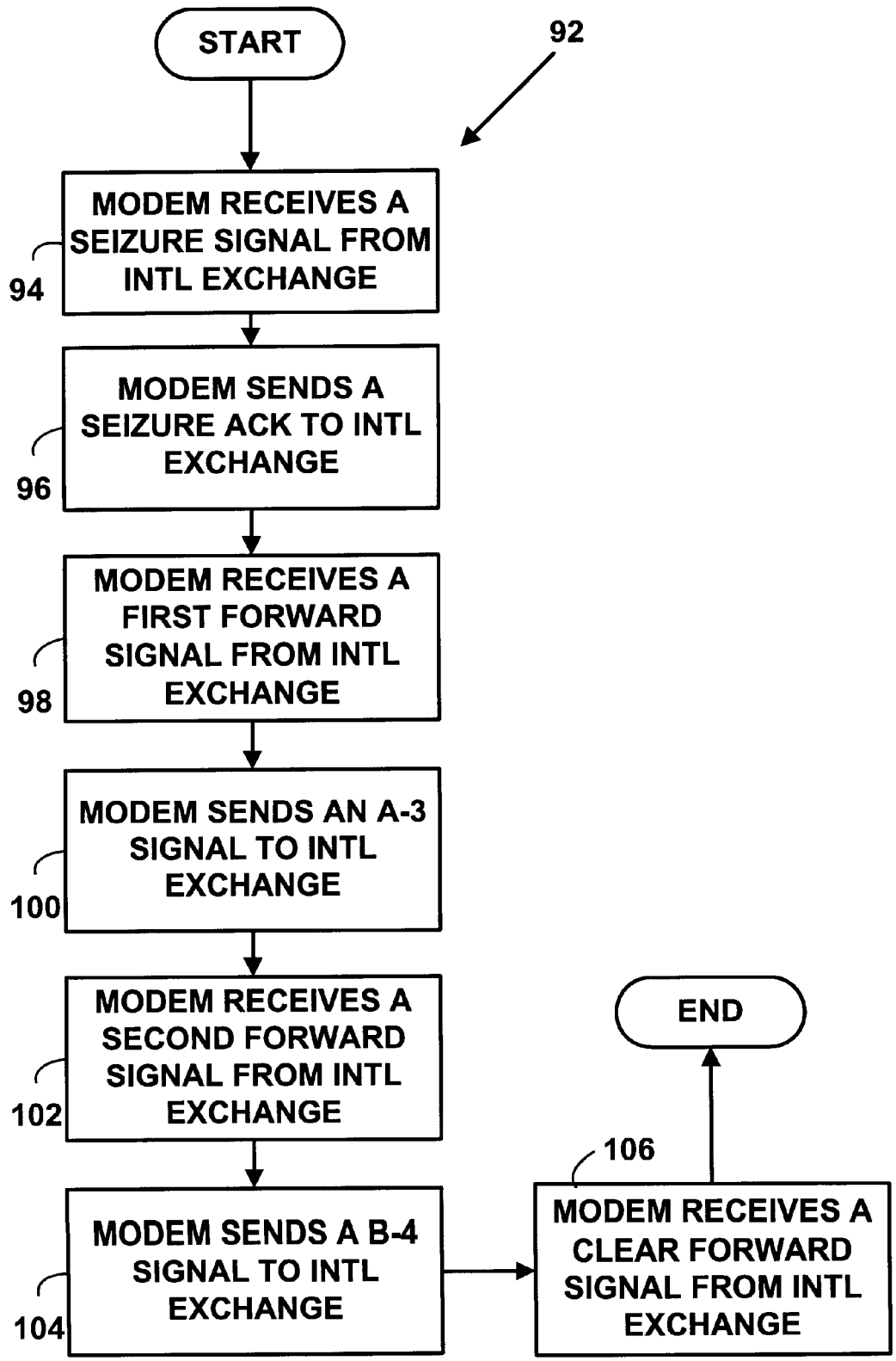
FIG. 6 is a flow diagram illustrating a method for R2-MFC short cycling when a problem occurs.

FIG. 6 is a flow diagram illustrating a method 92 for short R2-MFC cycling when a modem problem occurs. Steps 94, 96, 98, 100 and 102 are identical to steps 78, 80, 82, 84 and 86 of method 76 (FIG. 5). At step 104 of FIG. 6, modem 14 sends a backward B-4 signal 54 (i.e., a congestion signal) to international exchange 24 indicating a problem on modem 14. International exchange 24 sends a clear forward signal 48 to modem 14 in response to B-4 signal 54. At step 106, modem 14 receives clear forward signal 48 to clear the forward signals sent at steps 98 and 102 by international exchange 24. Method 92 terminates a data connection being established between modem 14 and modem 28 when a problem occurs on modem 14.

Figure 7:
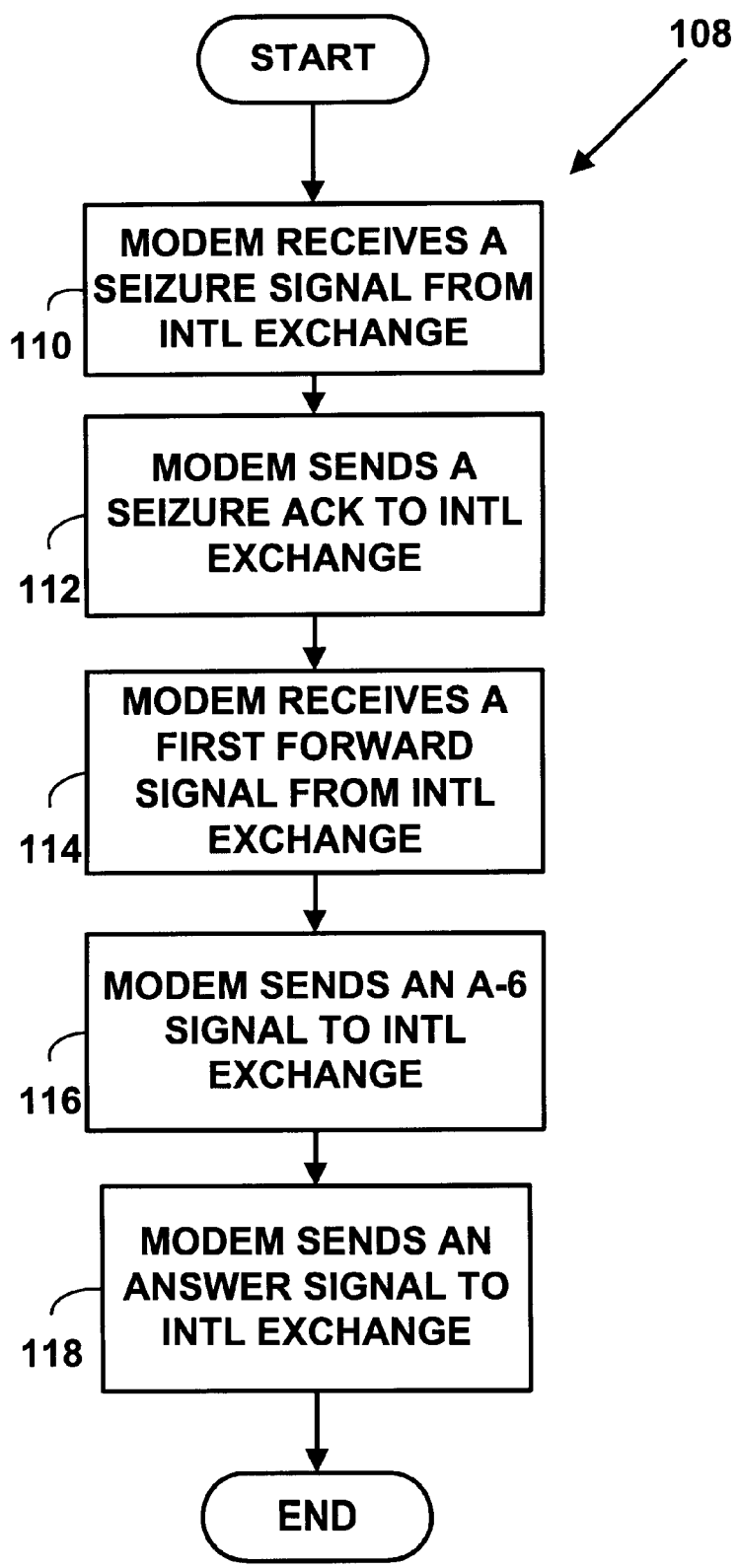
FIG. 7 is a flow diagram illustrating a method for short R2-MFC short cycling without a backward Group B signal.

FIG. 7 is a flow diagram illustrating a method 108 for short R2-MFC cycling without a backward Group B-signal. Steps 110, 112 and 114 are identical to steps 78, 80, and 82 of method 76 (FIG. 5). At step 116 in FIG. 7 modem 14 sends an A-6 signal 56 (e.g., address complete, charge, set up speed conditions) to international exchange 24. At step 118, modem 14 sends an answer signal 46 to international exchange 24. Method 108 completes data connection between modem 28 and modem 14 over an E1 trunk without a backward Group-B signal.

Figure 8A:
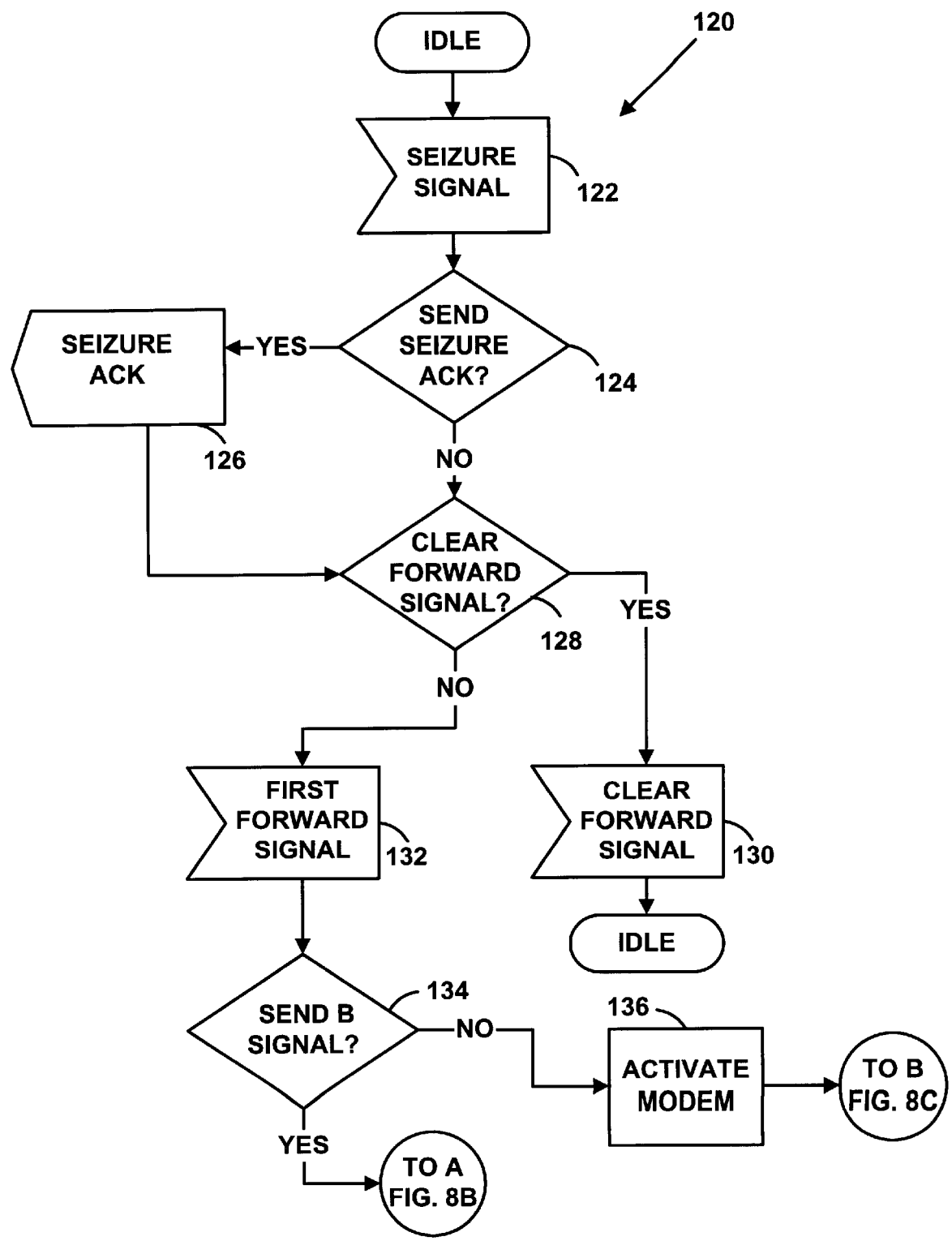
FIGS. 8A, 8B and 8C are a flow diagram illustrating a combination method for R2-MFC short cycling using the methods of FIGS. 4, 5, 6 and 7.
Figure 8B:
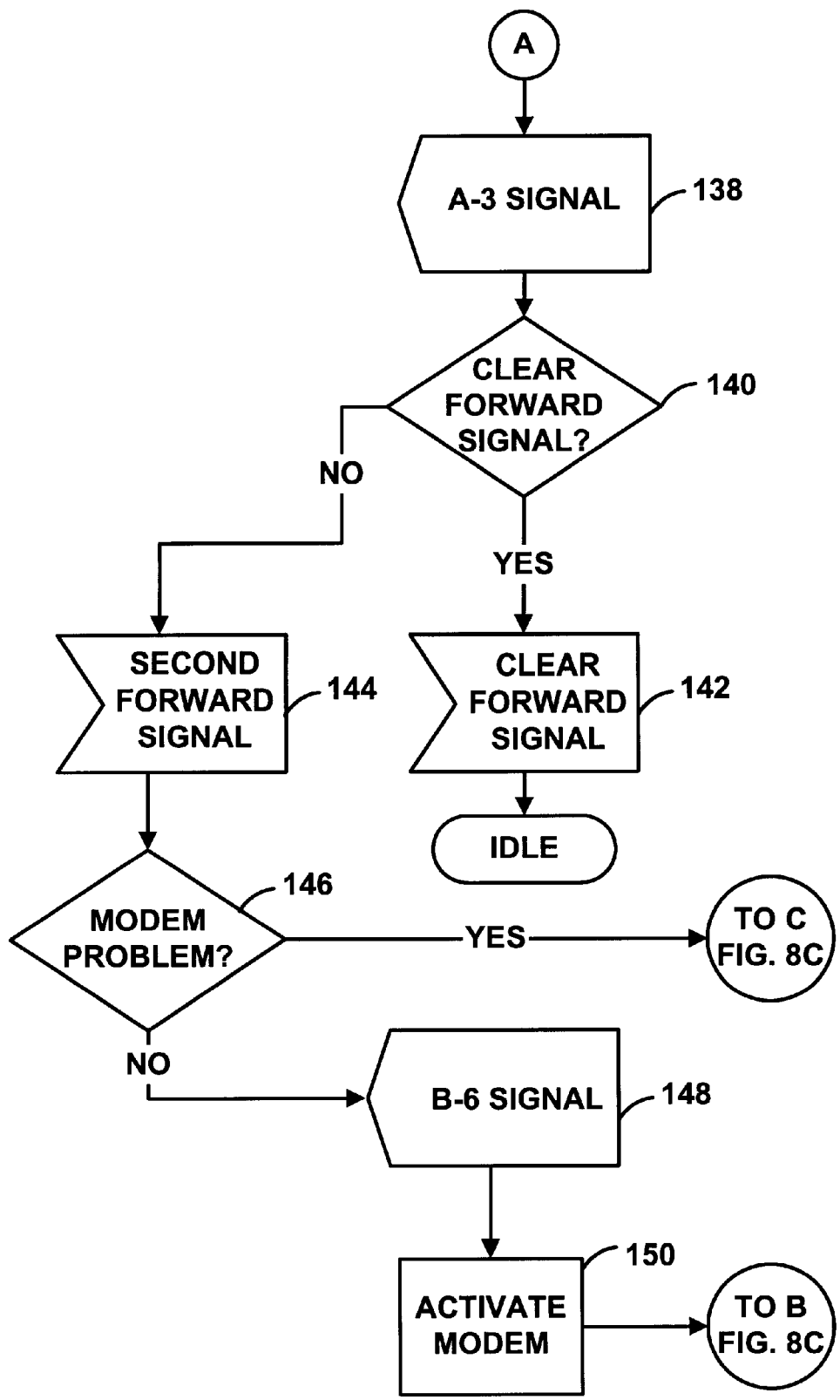
Figure 8C:
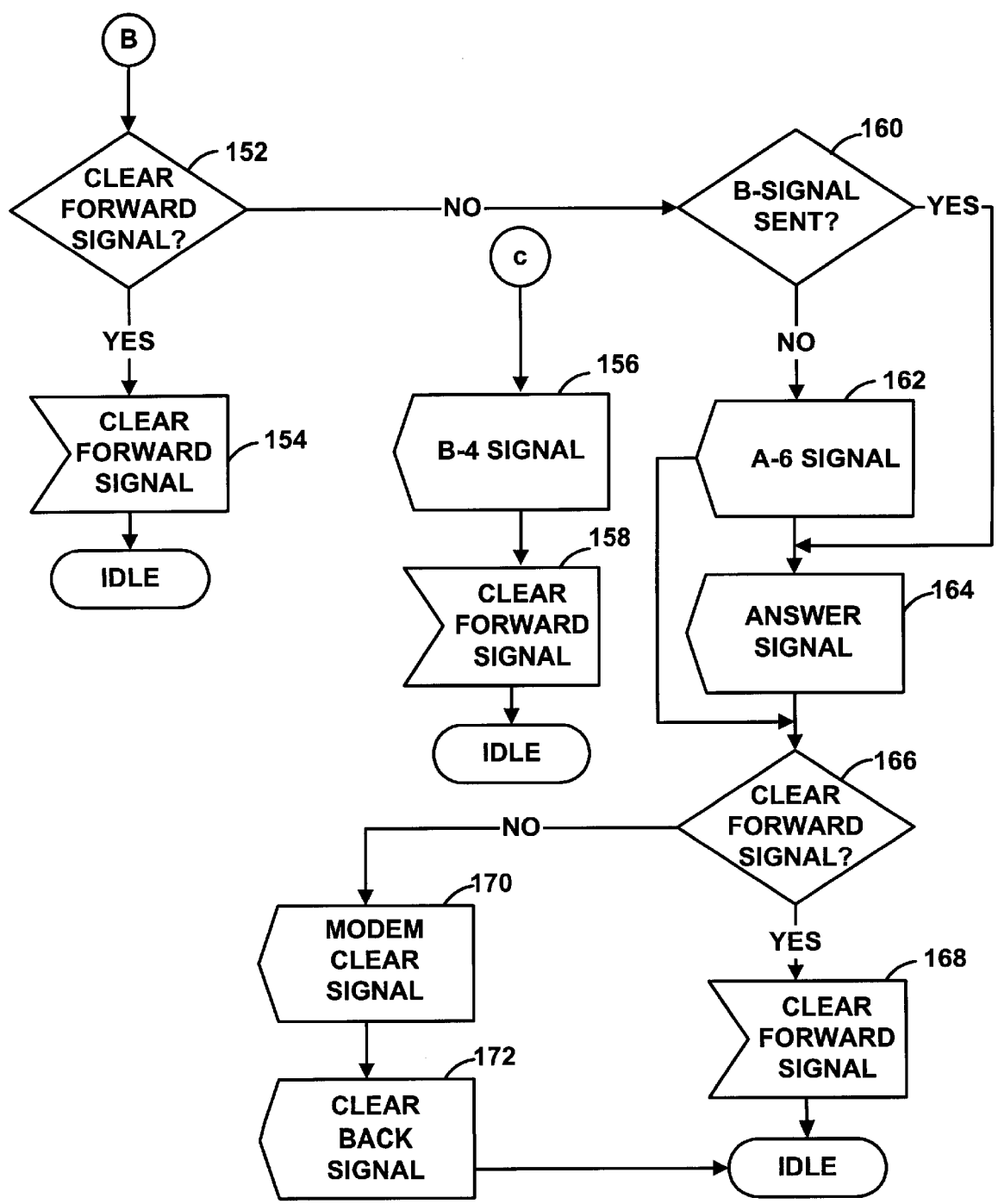

FIGS. 8A, 8B and 8C are a flow diagram illustrating a combination method 120 for short R2-MFC cycling using methods (62,76,92,108) of FIGS. 4, 5, 6 and 7. Method 120 is implemented in a modem (e.g., 14 or 28) to make a data connection using R2 data connection protocol 40 on an E1 trunk. For method 120, shapes such as those illustrated by 122, 130 and 132 in FIG. 8A indicate signals from R2-MFC data connection protocol 40 sent to modem 14 from international exchange 24. Shapes such as 126 in FIG. 8A indicate signals from R2 data connection protocol 40 sent from modem 14 to international exchange 24. However, method 120 can be used in other communication devices other than modems (e.g., a gateway) and is not limited to modems. The steps of methods 62, 76, 92 and 108 are included in method 120 as well as additional tests (e.g., 124,128,134,140, 146,152,160 and 166) and steps (136,150, 170, and 172) to allow a modem to accomplish methods (62,76,92,108) of FIGS. 4, 5, 6 and 7 as a single method 120, starting from, and returning to, an idle state.

Steps 122, 132, 138, 144, 148 and 164 of method 120 illustrate method 62 from FIG. 4. Steps 122, 126, 132, 138, 144, 148 and 164 of method 120 illustrate method 66 from FIG. 5. Steps 122, 126, 132, 138, 144, 156 and 158 of method 120 illustrate method 92 from FIG. 6. Steps 122, 126, 132, 162 and 164 of method 120 illustrate method 98 from FIG. 7.

Figure 9:
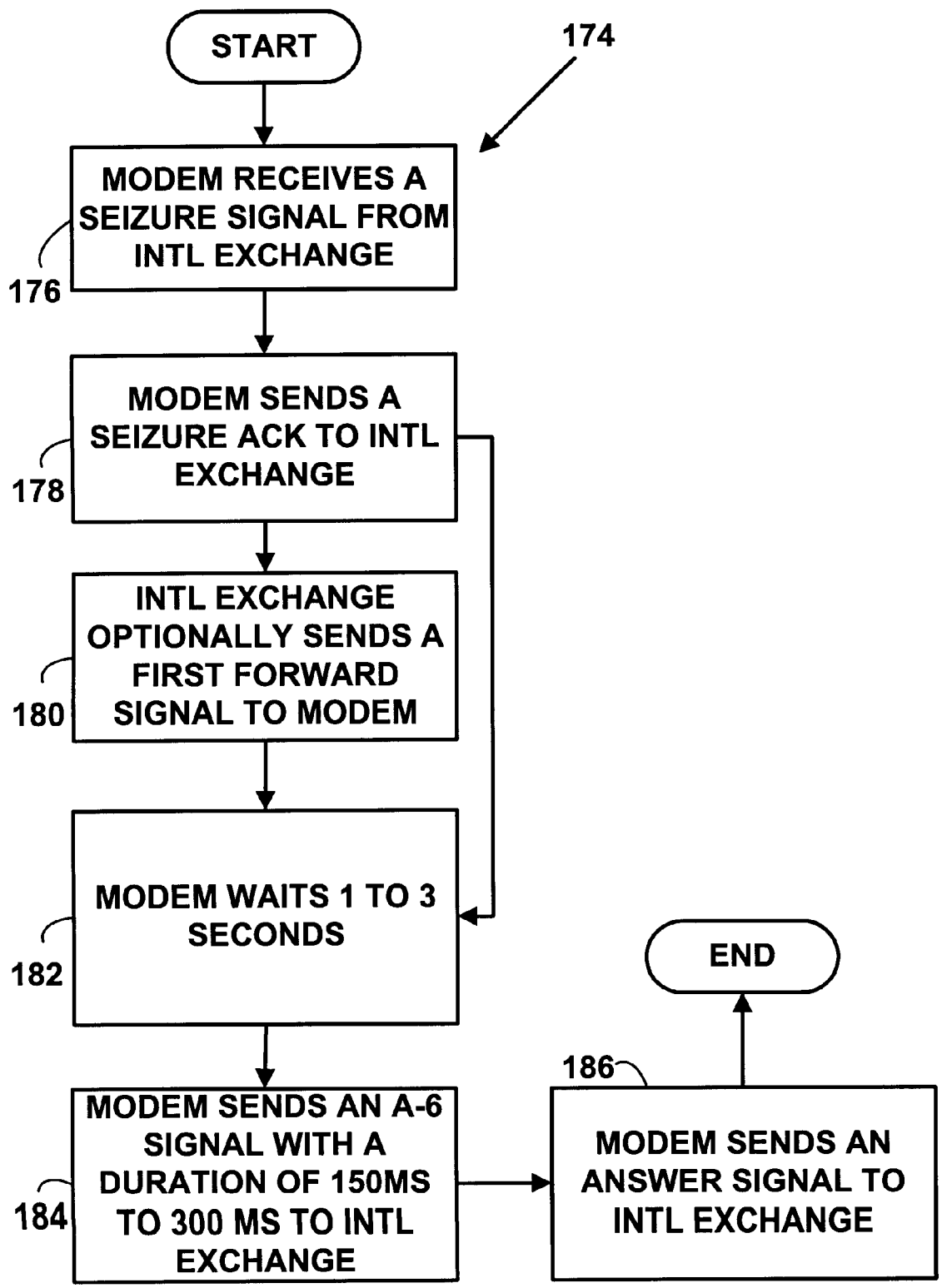
FIG. 9 is a flow diagram illustrating a method for R2-MFC spoofing with no forward signal detection.

R2-MFC data connection protocol 40 is used with R2-MFC spoofing on an E1 trunk. R2-MFC spoofing does not use a tone detection apparatus to detect forward register signals 60 sent by an international exchange with R2 data connection protocol 40. FIG. 9 is a flow diagram illustrating a method 174 for R2-MFC spoofing with no forward signal detection.

At step 176, modem 14 receives seizure signal 42. Modem 14 sends a seizure acknowledgment 44 to international exchange 24 at step 178. At step 180, international exchange 24 optionally sends a first forward register signal to modem 14. Method 174 does not require international exchange 24 send the first forward signal to modem 14 since no tone detection apparatus is used with method 174 to detect forward register signals. After sending seizure acknowledgment at step 178, modem 14 waits one to three seconds at step 182 whether or not international exchange 24 sends the first forward signal since the first forward signal is not detected. Modem 14 does not detect the forward register signal even if it is sent by international exchange 24. The modem wait time is adjustable in one-second steps in an illustrative embodiment of the present invention. However, other wait steps could also be used. After waiting one to three seconds at step 182, modem 14 sends an A-6 signal 56 (e.g., address complete, charge, set up speed connection) with a signal duration of 150–300 milli-seconds ("ms") to international exchange 24 at step 184. R2 signals normally have a continuous duration until the R2 signal is terminated or replaced by another R2 signal. A-6 signal 56 is adjustable by 50 ms duration steps in an illustrative embodiment of the present invention. However, other wait steps or duration steps could also be used. At step 186, modem 14 sends an answer signal 46 to modem 28. There is now a data connection between modem 28 and modem 14 over an E1 trunk. The data connection was accomplished with method 174 without the use of a tone detection apparatus to detect forward register signals.

Figure 10:
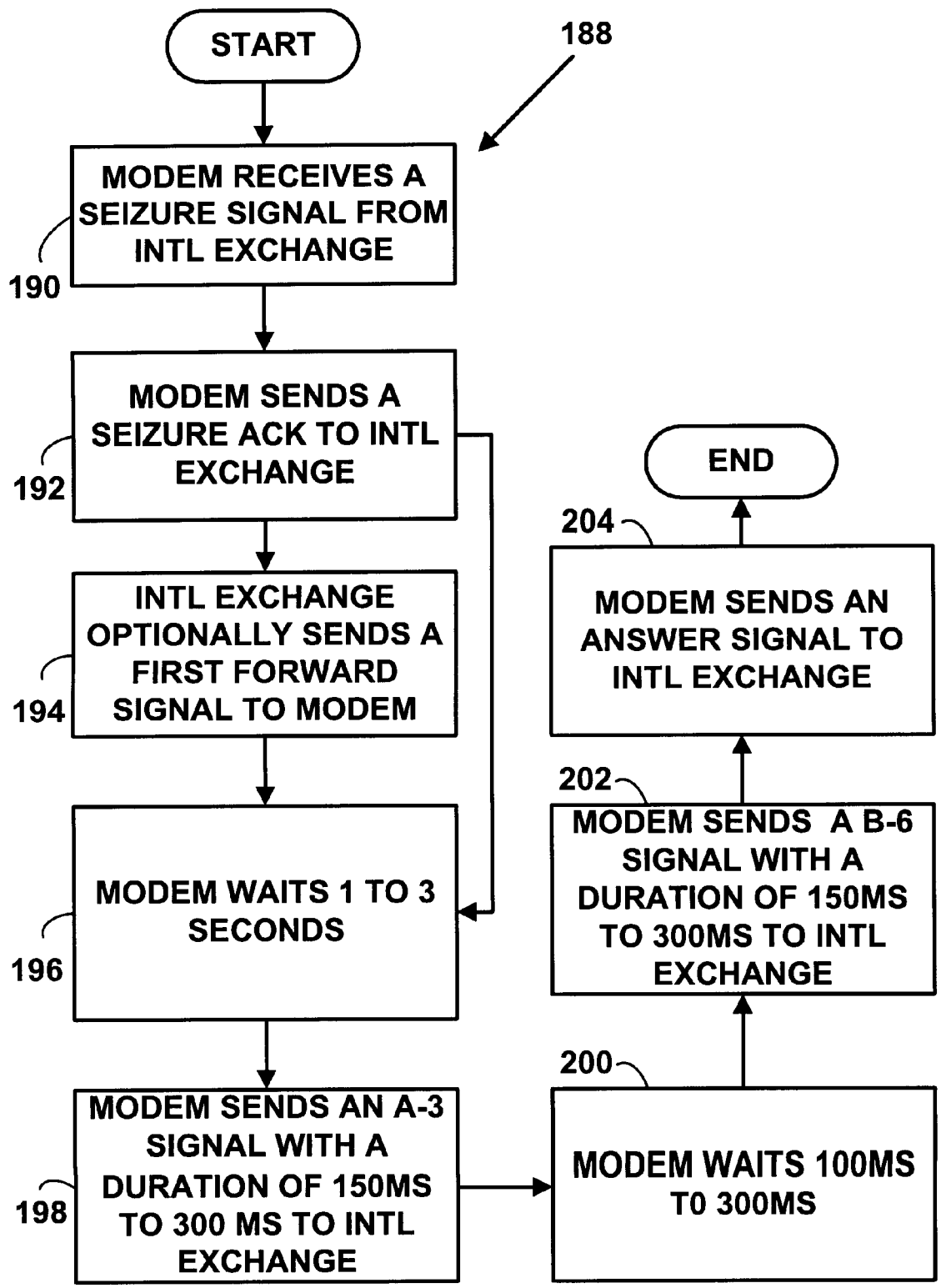
FIG. 10 is a flow diagram illustrating a method for R2-MFC spoofing with a backward Group B signal.

FIG. 10 is a flow diagram illustrating a method 188 for R2-MFC spoofing with a backward Group-B signal. Steps 190, 192, 194 and 196 are identical to steps 176, 178, 180 and 182 of method 174 from FIG. 9. At step 198 in FIG. 10, modem 14 sends an A-3 signal 50 (e.g., address complete, change over to reception of B-signals) with a duration of 150 ms to 300 ms to international exchange 24. A-3 signal 50 is adjustable by 50 ms duration steps in an illustrative embodiment of the present invention. However, other wait times or duration steps could also be used. At step 200, modem 14 waits 100 ms to 300 ms. The wait time is adjustable by 100 ms duration steps. However, other wait times or duration steps could also be used. A B-6 signal 58 (e.g., subscriber's line free, charge) is sent by modem 14 with a duration of 150 ms to 300 ms to international exchange 24 at step 202. B-6 signal 58 is adjustable by 50 ms duration steps in an illustrative embodiment of the present invention. However, other wait steps or duration steps could also be used. At step 204, modem 14 sends an answer signal 46 to international exchange 24. There is now a data connection between modem 28 and modem 14 over an E1. Method 188 also is accomplished without the use of a tone detection apparatus to detect forward register signals.

Figure 11:
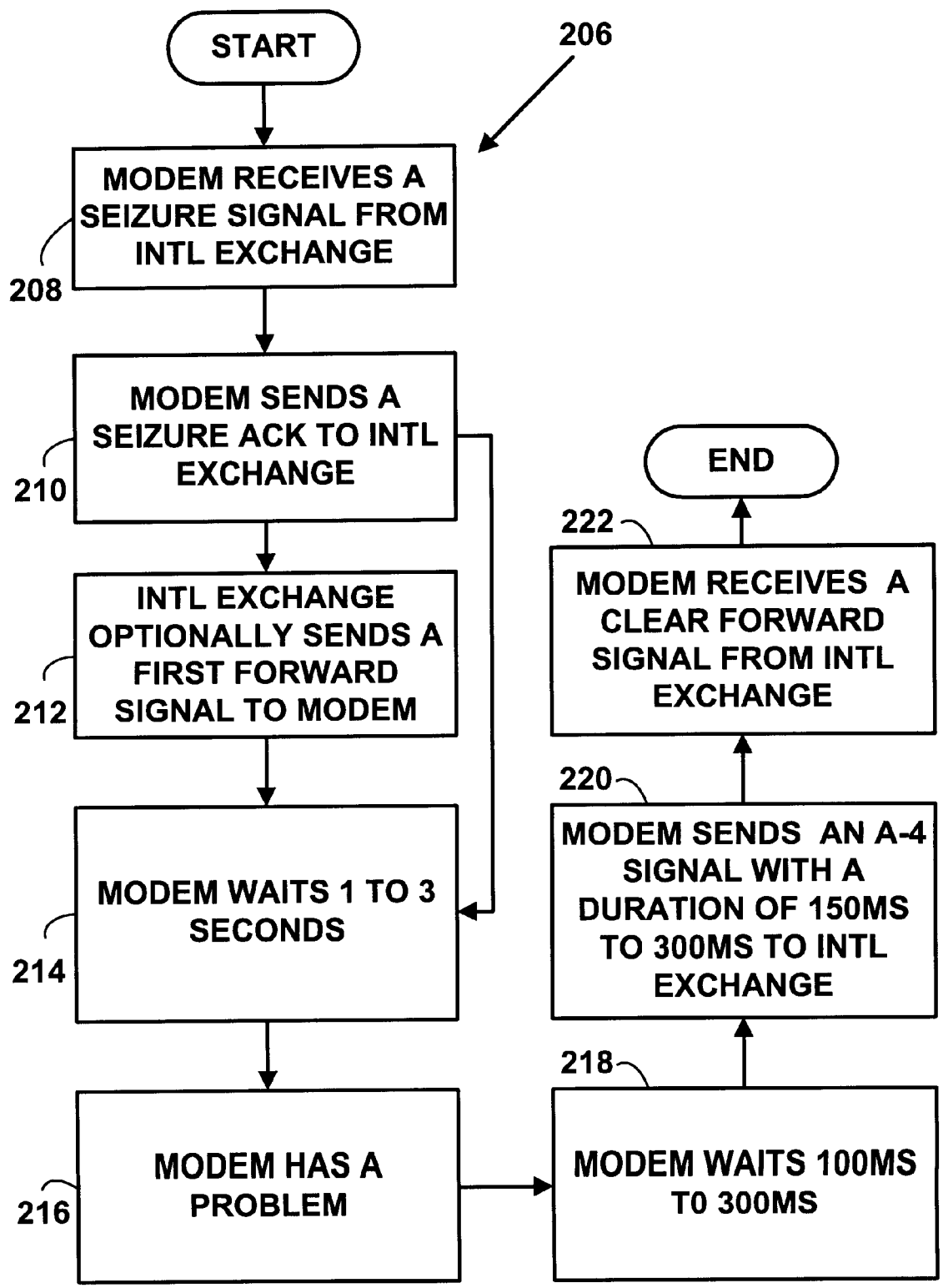
FIG. 11 is a flow diagram illustrating a method for R2-MFC spoofing when a problem occurs.

FIG. 11 is a flow diagram illustrating a method 206 for R2-MFC spoofing when a problem occurs. Steps 208, 210, 212 and 214 are identical to steps 176, 178, 180 and 182 of method 174 from FIG. 9. At step 216 in FIG. 11, a problem occurs with modem 14. At step 218, modem 14 waits 100 ms to 300 ms. The wait time is adjustable by 100 ms duration steps, however, other wait times or duration steps could also be used. At step 220, modem 14 sends an A-4 signal 52 (e.g., congestion in the national network) with duration of 150 ms to 300 ms to international exchange 24. A-4 signal 52 is adjustable by 50 ms duration steps in an illustrative embodiment of the present invention. However, other wait steps or duration steps could also be used. International exchange 24 sends clear forward signal 48 to modem 14 to clear the forward signal received. At step 222, modem 14 receives clear forward signal 48 from international exchange 24. The data connection being established between modem 28 and modem 14 is terminated with method 206.

Figure 12A:
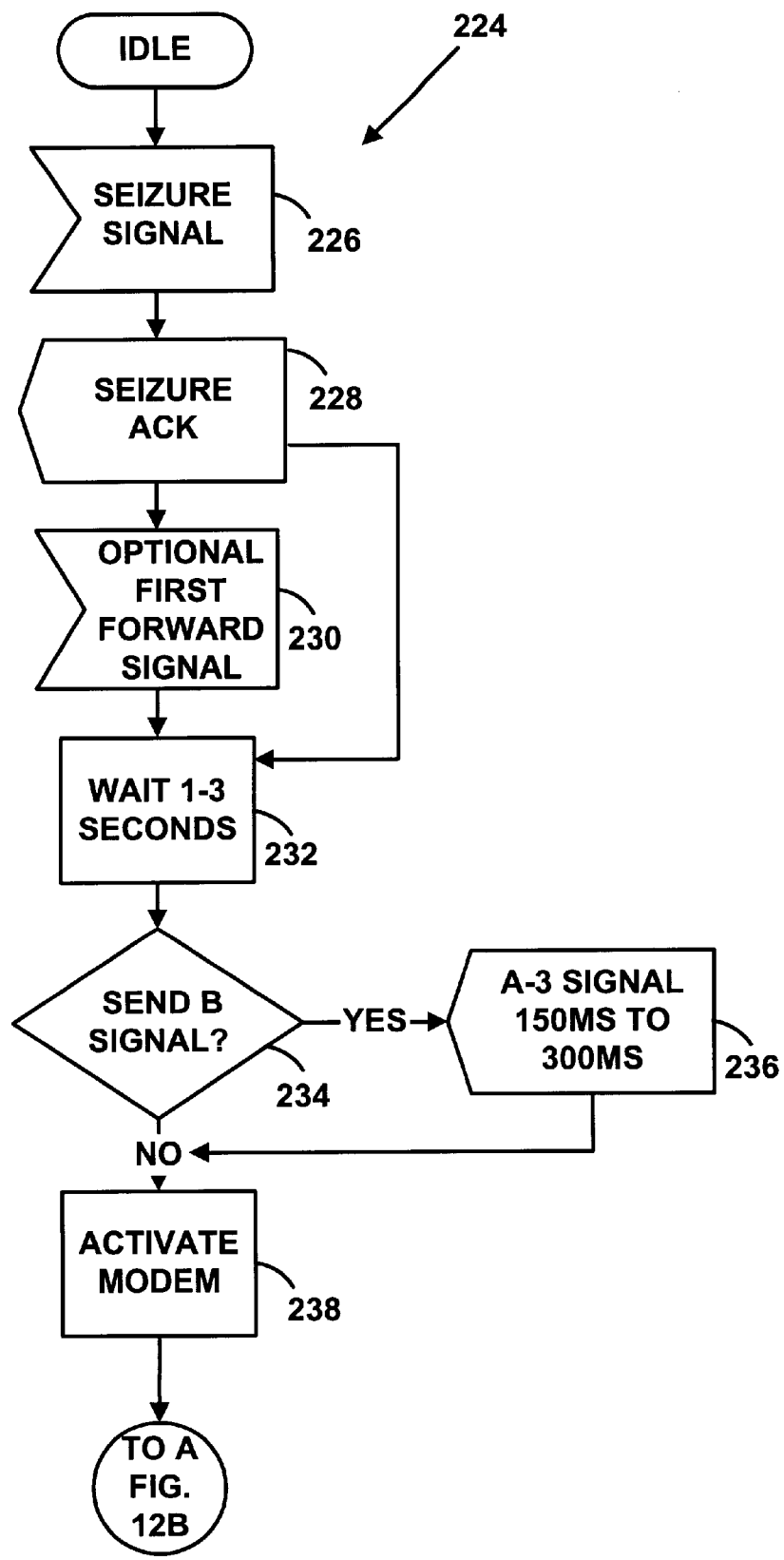
FIGS. 12A, 12B and 12C are a flow diagram illustrating a combination method for R2MFC spoofing using the methods of FIGS. 9, 10 and 11.
Figure 12B:
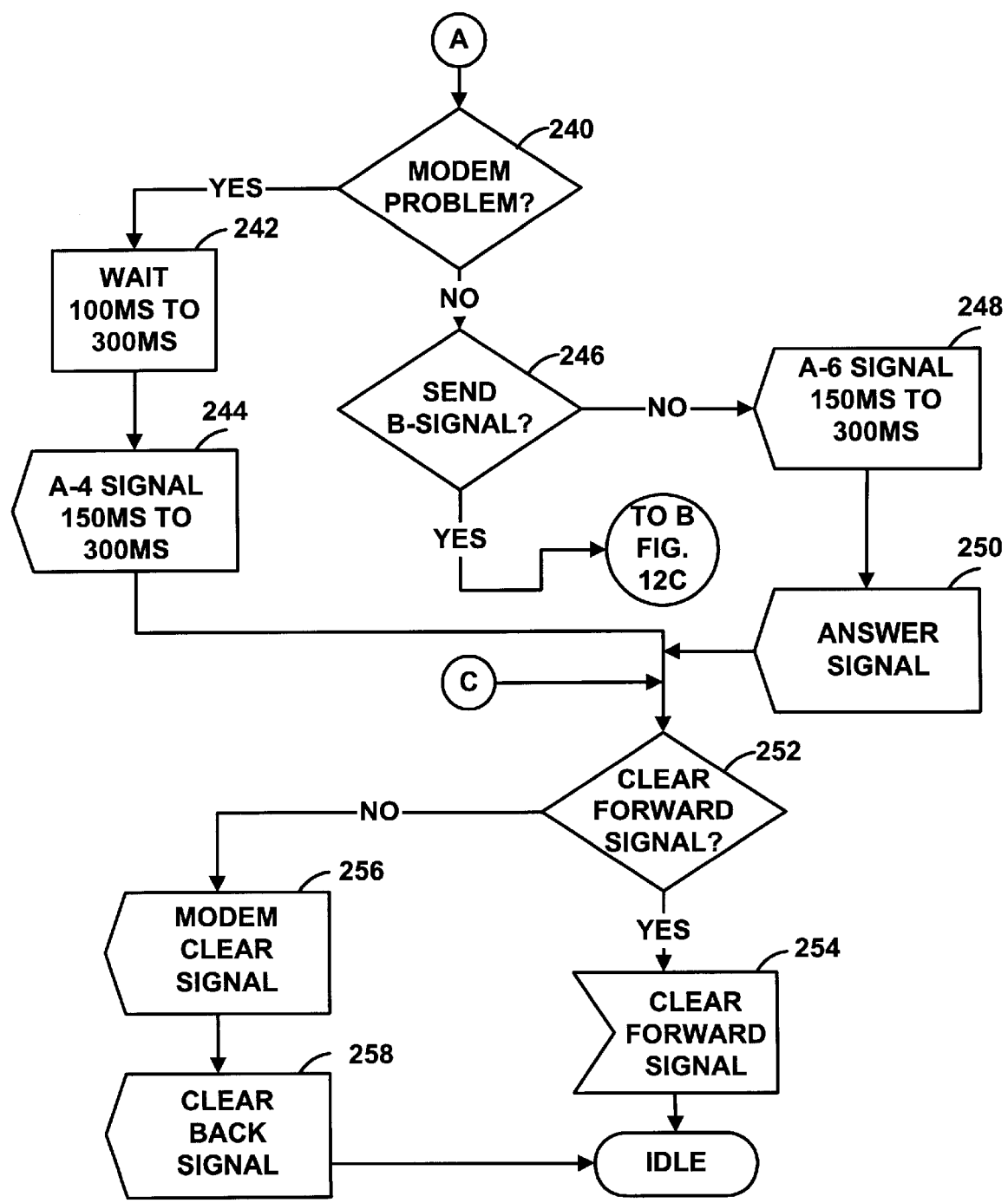
Figure 12C:
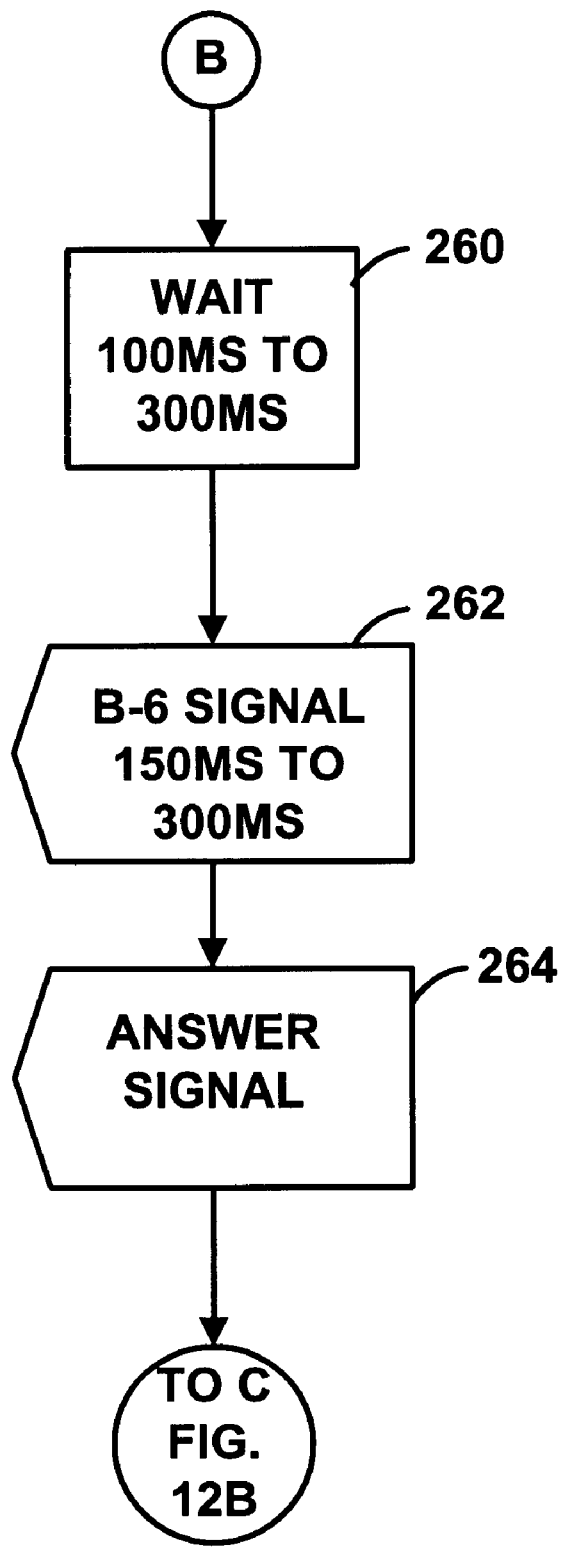

FIGS. 12A, 12B and 12C are a flow diagram illustrating a combination method 224 for R2-MFC spoofing using the methods 174, 188, and 206 of FIGS. 9, 10 and 11. Method 224 is implemented in a modem (e.g., 14 or 26) to make a data connection using R2-MFC data connection protocol on an E1 trunk. For method 224, shapes such as those illustrated by 226 in FIG. 12A indicate signals for R2-MFC data connection protocol 40 sent to modem 14 from an international exchange 24. Shapes such as 228 in FIG. 11A indicate signals from R2-MFC data connection protocol 40 sent from modem 14 to international exchange 24. However, method 224 can be used in other communication devices other than modems (e.g., a gateway).

The steps of methods 174 (FIG. 9), method 188 (FIG. 10) and method 206 (FIG. 11) are included in method 224. Additional tests (234,240,246,252) and steps (238,256,258) allow modem 14 to accomplish methods (174,188,206) of FIGS. 9, 10 and 11 as a single method 224, starting from and returning to a modem idle state. Steps 226, 228, 230, 232, 248 and 250 of method 224 illustrate method 174 of FIG. 9. Steps 226, 228, 230, 232, 236, 260, 262 and 264 illustrate method 188 of FIG. 10. Steps 226, 228, 230, 232, 240, 242, 244 and 254 illustrate method 206 of FIG. 11.

Figure 13:
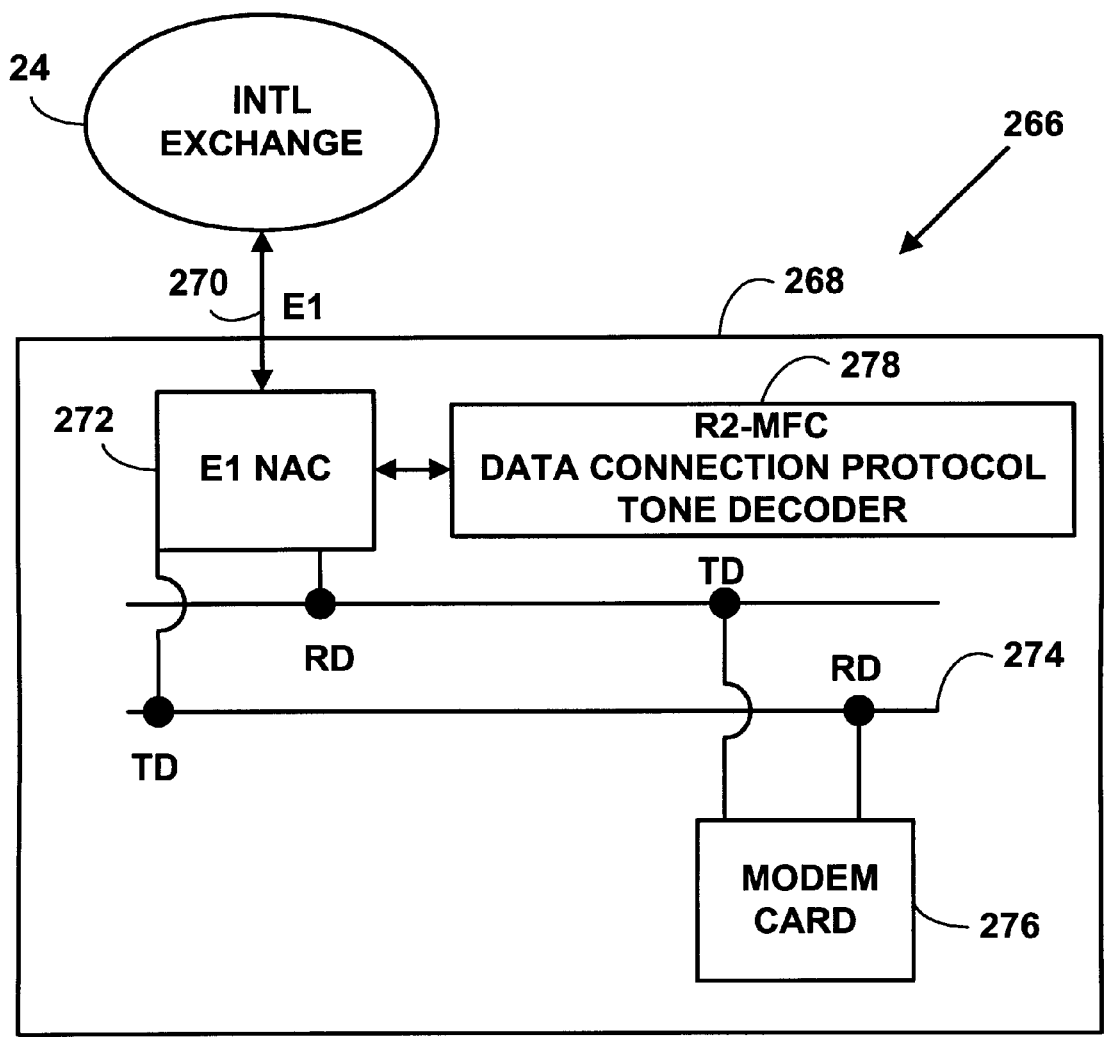
FIG. 13 is a block diagram illustrating an apparatus for an illustrative embodiment of the present invention.

FIG. 13 is a block diagram illustrating an apparatus 266 for an illustrative embodiment of the present invention. The apparatus includes a chassis 268, an E1 connection 270, an E1 Network Access Card ("NAC") 272 and a modem card 276 connected by a bus 274 in chassis 268. Modem card 276 has a CPU and a memory system connected by an internal bus. E1 NAC 272 has an optional tone decoder 278 to decode the signals used in R2-MFC data connection protocol 40 (FIG. 3) for R2-MFC short cycling illustrated in methods 62, 76, 92, 108 and 120.

Modem card 276 implements R2 data connection protocol 40, methods 62, 76, 92, 108, 174, 188 and 206 or combination methods 120 and 224, as software instructions. Modem card 276 receives R2-MFC signals from international exchange 24 via E1 connection 270, E1 NAC 272 and bus 274. E1 NAC 272 uses Channel Associated Signaling ("CAS") to interface with E1 connection 270 and pass R2-MFC signals to modem card 276 over bus 264. Chassis 268 shows one modem card 276, however multiple modem cards may also be used. Modem card 276 establishes a data connection with international exchange 24 with apparatus 276 as was discussed above. Incoming/outgoing registers (18,22 FIG. 1) are not illustrated in FIG. 13.

In an illustrative embodiment of the present invention, R2 data connection protocol 40, the methods and combination methods described above are implemented as software instructions in a U.S. Robotics modem card (e.g., a Quad Modem card) and used with a U.S. Robotics E1 card in "Total Control Telephony Chassis" by U.S. Robotics Corporation of Skokie, Ill. Additional information about the Total Control Telephony Chassis, and the modem card is described in U.S. Pat. No. 5,528,595, entitled "Modem Input/Output Signal Processing Techniques" issued to Walsh et al. ("Walsh") and incorporated herein by reference. The Walsh patent describes a telephony chassis with a T1 card which is the North American equivalent of an E1. As is known in the telecommunication arts, a T1 card has 24 channels with a data rate of 1.544 Mbps instead of 32 channels and a data rate of 2.068 Mbps on the E1 card. The T1 card in the Walsh patent is replaced with a U.S. Robotics E1 card to practice an illustrative embodiment of the present invention.

However, the present invention is not limited to U.S. Robotics modem cards, E1 cards, E1 connections, or for use in the U.S. Robotics Total Control Telephony Chassis. Other network interface cards, telecommunications connections using R2-MFC signaling and other network platforms could also be used.

R2 data connection protocol, R2-MFC short cycling and R2-MFC spoofing present several advantages over the prior art. Since the R2 data connection protocol only includes a small number of signals, it increases the connection speed and lowers the cost of a R2 data connection. It is easily adaptable and configurable for R2 signaling variations between countries.

R2-MFC short cycling provides rapid and reliable data connections even with telecommunications equipment that has connection timing variations. R2-MFC spoofing provides rapid and lost cost data connections without using tone detection apparatus to detect forward register signals, thereby reducing the cost of data connection equipment.

R2-MFC short cycling and R2-MFC spoofing are suitable for data services such as Internet or intranet access and teleconferencing. Data connection origination may be from many types of data terminals including personal computers, card swipes, teleconferencing equipment and others.

It should be understood that the programs, processes, methods and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the invention. For example, the steps of the flow diagrams may be taken in sequences other than those described, and more or fewer elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A computer readable medium having stored therein a set of routines for implementing a R2 data connection protocol for R2-MFC short cycling and for R2-MFC spoofing without a tone detection apparatus to detect forward register signals, the R2 data connection protocol providing a data connection between a first network node and a second network node in a computer network over a telecommunications connection, the telecommunications connection including a plurality of data bits sampled at a sampling interval T, the plurality of data bits sent in a plurality of time slots, the plurality of time slots having at least one signaling time slot and a plurality of data time slots, the computer readable medium comprising:

seizure signal, having a first-bit=0 and a second-bit=0 in a signaling time slot;

seizure acknowledgment signal, having a first-bit=1 and a second-bit=1 in a signaling time slot;

answer signal, having an first-bit=0 and a second-bit=1 in a signaling time slot;

clear forward signal, having an first-bit=1 and a second-bit=0 in a signaling time slot;

A-3 backward signal, having a signal of (1020 Hz+900 Hz) as data bits in a data time slot;

A-4 backward signal, having a signal of (1140 Hz+780 Hz) as data bits in a data time slot;

B-4 backward signal, having a signal of (1140 Hz+780 Hz) as data bits in a data time slot;

A-6 backward signal, having a signal of (900 Hz+780 Hz) as data bits in a data time slot;

B-6 backward signal, having a signal of (900 Hz+780 Hz) as data bits in a data time slot; and plurality of forward signals, including a pair of signals from any of 1380 Hz, 1500 Hz, 1620 Hz or 1980 Hz signals as a two-signal combination as data bits in a data time slot.

2. The computer readable medium of claim 1 wherein the first network node is a telecommunications exchange, the second network node is a modem, the telecommunications connection is an E1 connection, and the R2 data connection protocol is used to establish a R2 data connection.

3. In a telecommunications system having a first network node connected to a second network node with a telecommunications connection, a method of completing a data connection between the first and second network node with R2 short cycling, R2 short cycling using a data connection protocol with a sub-set of data connection signals from a voice connection protocol, the method comprising the following steps:

receiving a seizure signal on the second network node from the first network node over the telecommunications connection;

receiving a first forward signal on the second network node from the first network node over the telecommunications connection;

sending an A-3 backward signal from the second network node to the first network node over the telecommunications connection;

receiving a second forward signal on the second network node from the first network node over the telecommunications connection;

sending a B-6 signal from the second network node to the first network node over the telecommunications connection; and sending an answer signal from the second network node to the fist network node, thereby completing a data connection between the first network node and the second network node over the telecommunications connection wherein the signals used are from the data connection protocol.

4. A computer readable medium having stored therein instructions for causing a central processing unit to execute the method of claim 3.

5. The method of claim 3 further comprising:

sending a seizure acknowledgment signal from the second network node to the first network node in response to the seizure signal.

6. The method of claim 3 wherein the first network node is a telecommunications exchange, the second network node is a modem and the telecommunications connection is an E1 connection.

7. In a telecommunications system having a first network node connected to a second network node with a telecommunications connection, a method of completing a data connection between the first and second network node with R2-MFC short cycling, R2-MFC short cycling using a data connection protocol with a sub-set of data connection signals from a voice connection protocol, the method comprising the following steps:

receiving a seizure signal on the second network node from the first network node over the telecommunications connection;

sending a seizure acknowledgment from the second network node to the first network node over the telecommunications connection;

receiving a first forward signal on the second network node from the first network node over the telecommunications connection;

sending an A-6 backward signal from the second network node to the first network node over the telecommunications connection; and sending an answer signal from the second network node to the fist network node, thereby completing a data connection between the first network node and the second network node over the telecommunications connection wherein the signals used are from the data connection protocol.

8. A computer readable medium having stored therein instructions for causing a central processing unit to execute the method of claim 7.

9. The method of claim 7 wherein the first network node is a telecommunications exchange, the second network node is a modem and the telecommunications connection is an E1 connection.

10. In a telecommunications system having a first network node connected to a second network node with a telecommunications connection, a method of terminating a data connection being established between the first and second network node with R2-MFC short cycling, R2-MFC short cycling using a R2 data connection protocol with a sub-set of data connection signals from a voice connection protocol, the method comprising the following steps:

receiving a seizure signal on the second network node from the first network node over the telecommunications connection;

sending a seizure acknowledgment from the second network node to the first network node over the telecommunications connection;

receiving a first forward signal on the second network node from the first network node to the second network node over the telecommunications connection;

sending an A-3 backward signal from the second network node to the first network node over the telecommunications connection;

receiving a second forward signal on the second network node from the first network node over the telecommunications connection;

sending a B-4 backward signal from the second network node to the first network node over the telecommunications connection; and receiving a clear forward signal on the second network node from the first network node over the telecommunications connection, thereby clearing the forward signals sent between the first network node and the second network node and terminating the data connection being established between the first network node and the second network node.

11. A computer readable medium having stored therein instructions for causing a central processing unit to execute the method of claim 10.

12. The method of claim 10 wherein the first network node is a telecommunications exchange, the second network node is a modem and the telecommunications connection is an E1 connection.

13. In a telecommunications system having a first network node connected to a second network node with a telecommunications connection, a method of completing a data connection between the first and second network node with R2-MFC spoofing without a tone detection apparatus to detect forward signals, R2-MFC spoofing using a data connection protocol with a sub-set of data connection signals from a voice connection protocol, the method comprising the following steps:

receiving a seizure signal on the second network node from the first network node over the telecommunications connection;

sending a seizure acknowledgment from the second network node to the first network node over the telecommunications connection;

waiting for a first wait time on the second network node;

sending an A-6 backward signal with backward signal duration from the second network node to the first network node over the telecommunications connection; and sending an answer signal from the second network node to the fist network node, thereby completing a data connection between the first network node and the second network node over the telecommunications connection wherein the signals used are from the data connection protocol.

14. A computer readable medium having stored therein instructions for causing a central processing unit to execute the method of claim 13.

15. The method of claim 13 wherein the first network node is a telecommunications exchange, the second network node is a modem and the telecommunications connection is an E1 connection and the first wait time is one to three seconds.

16. In a telecommunications system having a first network node connected to a second network node with a telecommunications connection, a method of completing a data connection between the first and second network node with R2-MFC spoofing without a tone detection apparatus to detect forward register signals, the R2-MFC spoofing using a data connection protocol with a sub-set of data connection signals from a voice connection protocol, the method comprising the following steps:
   receiving a seizure signal on the second network node from the first network node to the second network node over the telecommunications connection;
   sending a seizure acknowledgment from the second network node to the first network node over the telecommunications connection;
   waiting for a first wait time on the second network node;
   sending an A-3 backward signal with a first backward signal duration from the second network node to the first network node over the telecommunications connection;
   waiting for a second wait time on the second network node;
   sending a B-6 backward signal with a second backward signal duration from the second network node to the first network node over the telecommunications connection; and
   sending an answer signal from the second network node to the fist network node, thereby completing a data connection between the first network node and the second network node over the telecommunications connection wherein the signals used are from the data connection protocol.

17. A computer readable medium having stored therein instructions for causing a central processing unit to execute the method of claim 16.

18. The method of claim 16 wherein the first network node is a telecommunications exchange, the second network node is a modem and the telecommunications connection is an E1 connection.

19. The method of claim 16 wherein the first wait time is one to three seconds and the second wait time is 100 milliseconds to 300 milliseconds.

20. The method of claim 16 wherein the first backward signal duration and the second backward signal duration are 150 milliseconds to 300 milliseconds.

21. In a telecommunications system having a first network node connected to a second network node with an telecommunications connection, a method of terminating a data connection being established between the first and second network node with R2-MFC spoofing without a tone detection apparatus to detect forward signals, using a data connection protocol with a sub-set of data connection signals from a voice connection protocol, the method comprising the following steps:
   receiving a seizure signal from the first network node to the second network node over the telecommunications connection;
   sending a seizure acknowledgment from the second network node to the first network node over the telecommunications connection;
   waiting for a first wait time on the second network node;
   waiting for a second wait time on the second node after encountering a problem on the second network node; and
   sending an A-4 backward signal with backward signal duration from the second network node to the first network node over the telecommunications connection; and
   receiving a clear forward signal on the second network node from the first network node over the telecommunications connection, thereby clearing the forward signals sent between the first network node and the second network node and terminating the data connection being established between the first network node and the second network node.

22. A computer readable medium having stored therein instructions for causing a central processing unit to execute the method of claim 21.

23. The method of claim 21 wherein the first network node is a telecommunications exchange, the second network node is a modem and the telecommunications connection is an E1 connection.

24. The method of claim 21 wherein the first wait time is one to three seconds, the second wait time is 100 milliseconds to 300 milliseconds.

25. The method of claim 21 wherein the first and second backward signal durations are 150 milliseconds to 300 milliseconds.

26. A communications signaling apparatus. the apparatus comprising:
   protocol interpreter, for interpreting a R2 data connection protocol used to make a R2 data connection between a first network node and a second network node over a telecommunications connection in a telecommunications system;
   first R2 data connector, for establishing a R2 data connection between the
   first and second network nodes with R2-MFC short cycling; and
   second R2 data connector, for establishing a R2 data connection between the first and second network nodes with R2-MFC spoofing without a tone detection apparatus to detect forward signals.

27. A communications signaling apparatus, the apparatus comprising:
   protocol interpreter, for interpreting a R2 data connection protocol used to make a R2 data connection between a first network node and a second network node over a telecommunications connection in a telecommunications system;
   first R2 data connector, for establishing a R2 data connection between the first and second network nodes with R2-MFC short cycling;
   second R2 data connector, for establishing a R2 data connection between the first and second network nodes with R2-MFC spoofing without a tone detection apparatus to detect forward signals; and
   first R2 data terminator, for terminating a R2-MFC data connection between the first and second network nodes.

28. The apparatus of claim 26 wherein the protocol interpreter interprets a R2-MFC data connection protocol including: a seizure signal with a first signaling bit=0 and a signaling second bit=0; a seizure acknowledgment with a first signaling bit=1 and a second signaling bit=1; an answer signal with a first signaling bit=0 and a second signaling bit=1; a clear forward signal with a first signaling bit=1 and a second signaling bit=0; an A3 backward signal having a signal of (1020 Hz+900 Hz); an A4 backward signal having a signal of (1140 Hz+780 Hz); a B4 backward signal having a signal of (1140 Hz+780 Hz); an A6 backward signal having a signal of (900 Hz+780 Hz); a B6 backward signal having a signal of (900 Hz+780 Hz); and a plurality of forward signals with any combination of 1380 Hz, 1500 Hz, 1620 Hz, 1740 Hz, 1860 Hz or 1980 Hz in a two signal combination.

29. The apparatus of claim 26 wherein the apparatus is any of a modem, a telecommunications exchange, or a remote access server.

* * * * *